US00RE38871E

(19) United States
(12) Reissued Patent
Sekiguchi et al.

(10) Patent Number: US RE38,871 E
(45) Date of Reissued Patent: Nov. 8, 2005

(54) DATA RECEIVING APPARATUS AND METHOD

(75) Inventors: Shun-ichi Sekiguchi, Tokyo (JP); Tokumichi Murakami, Tokyo (JP); Yoshiaki Kato, Tokyo (JP)

(73) Assignee: Mitsubishi Denki Kabushiki Kaisha, Tokyo (JP)

(21) Appl. No.: 09/589,389

(22) Filed: Jun. 8, 2000

Related U.S. Patent Documents

Reissue of:
(64) Patent No.: 5,764,658
Issued: Jun. 9, 1998
Appl. No.: 08/322,099
Filed: Oct. 12, 1994

(51) Int. Cl.[7] ..... H03M 13/00
(52) U.S. Cl. ..... 714/752; 375/240.02; 375/240.12
(58) Field of Search ..... 714/752; 375/240.02, 375/240.12

(56) References Cited

U.S. PATENT DOCUMENTS

| | | | | |
|---|---|---|---|---|
| 4,612,613 A | * | 9/1986 | Gershenson et al. | 710/74 |
| 5,111,292 A | * | 5/1992 | Kuriacose et al. | 375/240.01 |
| 5,117,288 A | * | 5/1992 | Eisenhardt et al. | 375/240.12 |
| 5,168,356 A | * | 12/1992 | Acampora et al. | 375/240.15 |
| 5,228,028 A | * | 7/1993 | Cucchi et al. | 370/392 |
| 5,289,276 A | * | 2/1994 | Siracusa et al. | 348/469 |
| 5,327,173 A | * | 7/1994 | Nishizawa et al. | 375/240.14 |
| 5,414,468 A | * | 5/1995 | Lee | 375/240.16 |
| 5,603,012 A | * | 2/1997 | Sotheran | 712/208 |

FOREIGN PATENT DOCUMENTS

| | | | |
|---|---|---|---|
| EP | 0613300 | * | 8/1994 |
| WO | WO94/00952 | * | 1/1994 |

OTHER PUBLICATIONS

Al–Subbagh, et al.; "Optimum Patterns for Frame Alignment", IEEE Proceedings, vol. 135 No. 6; Dec. 1988.*

Information Technology, "Generic Coding of Moving Pictures and Associated Audio", Sep. 9, 1993.*

* cited by examiner

*Primary Examiner*—Leo Picard
*Assistant Examiner*—Sheela S Rao
(74) *Attorney, Agent, or Firm*—Birch, Stewart, Kolasch & Birch, LLP

(57) ABSTRACT

The present invention is to provide a decoder which detects a start code in a layered coded data stream on a layer basis for improving an error detecting function to reduce possible damaging effects, and replaces a detected start code with minor error by an appropriate start code to maintain decoding.

The decoder includes a unique pattern detector which detects a start code pattern in a layered coded data stream, a start code identifier which identifies the detected start code pattern based on a given condition, a similarity calculator which calculates similarity as an evaluation between the error detected start code pattern and an expected start code based on layer, and a similarity based replacement identifier which replaces the error detected start code pattern by the most appropriate replacement selected based on the similarity based evaluation, and otherwise the priority based replacement identifier which selects a replacement by the priority order.

31 Claims, 36 Drawing Sheets

FIG. 4

| START CODES | BIT STRING IN HEXADECIMAL |
|---|---|
| PICTURE START CODE | 00000100 |
| SLICE START CODE | 00000101~000001AF |
| USER DATA START CODE | 000001B2 |
| SEQUENCE START CODE | 000001B3 |
| EXTENSION DATA START CODE | 000001B5 |
| SEQUENCE END CODE | 000001B7 |
| GROUP START CODE | 000001B8 |

| LAYER | START CODE OF START DELIMITER OF LAYER |
|---|---|
| SEQUENCE | SEQUENCE_START_CODE |
| GROUP OF PICTURES (GOP) | GROUP_START_CODE |
| PICTURE | PICTURE_START_CODE |
| SLICE | SLICE_START_CODE |

FIG. 10

| LATEST LAYER | EXPECTED START CODE |
|---|---|
| SEQUENCE | GROUP_START_CODE<br>EXTENSION_DATA_START_CODE<br>USER_DATA_START_CODE |
| GOP | PICTURE_START_CODE<br>EXTENSION_DATA_START_CODE<br>USER_DATA_START_CODE |
| PICTURE | SLICE_START_CODE<br>EXTENSION_DATA_START_CODE<br>USER_DATA_START_CODE |
| SLICE | SLICE_START_CODE<br>PICTURE_START_CODE<br>GROUP_START_CODE<br>SEQUENCE_START_CODE<br>SEQUENCE_END_CODE |

FIG.22

| LATEST LAYER | LAYER BASED EXPECTED START CODE | EXPECTATION VALUE OF OCCURRENCE |
|---|---|---|
| SEQUENCE | GROUP_START_CODE | 8 |
| | EXTENSION_DATA_START_CODE | 1 |
| | USER_DATA_START_CODE | 1 |
| GOP | PICTURE_START_CODE | 6 |
| | EXTENSION_DATA_START_CODE | 2 |
| | USER_DATA_START_CODE | 2 |
| PICTURE | SLICE_START_CODE | 6 |
| | EXTENSION_DATA_START_CODE | 2 |
| | USER_DATA_START_CODE | 2 |
| SLICE | SLICE_START_CODE | 2 |
| | PICTURE_START_CODE | 2 |
| | GROUP_START_CODE | 2 |
| | SEQUENCE_START_CODE | 2 |
| | SEQUENCE_END_CODE | 2 |

FIG.23

| LATEST LAYER | LAYER BASED EXPECTED START CODE | EXPECTATION VALUE OF OCCURRENCE |
|---|---|---|
| SEQUENCE | GROUP_START_CODE | 10 |
| | EXTENSION_DATA_START_CODE | 0 |
| | USER_DATA_START_CODE | 0 |
| GOP | PICTURE_START_CODE | 10 |
| | EXTENSION_DATA_START_CODE | 0 |
| | USER_DATA_START_CODE | 0 |
| PICTURE | SLICE_START_CODE | 10 |
| | EXTENSION_DATA_START_CODE | 0 |
| | USER_DATA_START_CODE | 0 |
| SLICE | SLICE_START_CODE | 2 |
| | PICTURE_START_CODE | 2 |
| | GROUP_START_CODE | 2 |
| | SEQUENCE_START_CODE | 2 |
| | SEQUENCE_END_CODE | 2 |

FIG. 24

| LATEST LAYER | LAYER BASED EXPECTED START CODE | EXPECTATION VALUE OF OCCURRENCE |
|---|---|---|
| SEQUENCE | GROUP_START_CODE | 8 |
| | EXTENSION_DATA_START_CODE | 2 |
| | USER_DATA_START_CODE | 0 |
| GOP | PICTURE_START_CODE | 8 |
| | EXTENSION_DATA_START_CODE | 2 |
| | USER_DATA_START_CODE | 0 |
| PICTURE | SLICE_START_CODE | 8 |
| | EXTENSION_DATA_START_CODE | 2 |
| | USER_DATA_START_CODE | 0 |
| SLICE | SLICE_START_CODE | 2 |
| | PICTURE_START_CODE | 2 |
| | GROUP_START_CODE | 2 |
| | SEQUENCE_START_CODE | 2 |
| | SEQUENCE_END_CODE | 2 |

FIG.25

| LATEST LAYER | LAYER BASED EXPECTED START CODE | PRIORITY ORDER |
|---|---|---|
| SEQUENCE | GROUP_START_CODE | 1 |
| | EXTENSION_DATA_START_CODE | 2 |
| | USER_DATA_START_CODE | 3 |
| GOP | PICTURE_START_CODE | 1 |
| | EXTENSION_DATA_START_CODE | 2 |
| | USER_DATA_START_CODE | 3 |
| PICTURE | SLICE_START_CODE | 1 |
| | EXTENSION_DATA_START_CODE | 2 |
| | USER_DATA_START_CODE | 3 |
| SLICE | SLICE_START_CODE | 1 |
| | PICTURE_START_CODE | 1 |
| | GROUP_START_CODE | 1 |
| | SEQUENCE_START_CODE | 1 |
| | SEQUENCE_END_CODE | 1 |

FIG. 30

| LAYER | TIME PERIOD (ms) |
|---|---|
| SEQUENCE | 10 |
| GOP | 5 |
| PICTURE | 4 |
| SLICE | 2 |

FIG. 33

| LATEST LAYER | EXPECTED START CODE |
|---|---|
| SEQUENCE | GROUP_START_CODE<br>PICTURE_START_CODE<br>EXTENSION_DATA_START_CODE<br>USER_DATA_START_CODE<br>N. B.) EXTENSION DATA IS REQUIRED TO FOLLOW SEQUENCE_START_CODE |
| GOP | PICTURE_START_CODE<br>EXTENSION_DATA_START_CODE<br>USER_DATA_START_CODE |
| PICTURE | SLICE_START_CODE<br>EXTENSION_DATA_START_CODE<br>USER_DATA_START_CODE<br>N. B.) EXTENSION DATA IS REQUIRED TO FOLLOW PICTURE_START_CODE |
| SLICE | SLICE_START_CODE<br>PICTURE_START_CODE<br>GROUP_START_CODE<br>SEQUENCE_START_CODE<br>SEQUENCE_END_CODE |

FIG. 35

| LATEST LAYER | EXPECTED START CODE |
|---|---|
| PACK | SYSTEM_HEADER_START_CODE<br>PACKET_START_CODE |
| SYSTEM HEADER | PACKET_START_CODE |
| PACKET | PACKET_START_CODE<br>PACK_START_CODE<br>PACK_END_CODE |

| | |
|---|---|
| 0-BIT ERROR | 11010 |
| 1-BIT ERROR | 01010 |
| | 10011 |
| | 11110 |
| | 11000 |
| | 11011 |

DATA RECEIVING APPARATUS AND METHOD

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a data receiving method and apparatus, and more specifically to a decoder which deals with a coded data stream in a regularly organized layered structure of user information including video, audio, data and so forth.

2. Description of the Related Art

It has been a common practice to use a start code as a signal for synchronization or for execution startup of a process. Successful detection of a start code in a data stream has long been a challenge. It is also important to deal successfully with a situation where a start code pattern is detected by error and, particularly, to maintain a decoding operation without interruption by an error detection. However, no effective and satisfactory research has been conducted in this field.

Japanese Unexamined Patent Publication No. 288129/1989 discloses a conventional system which tries to detect a start code of a fixed bit pattern within a maximum detection tolerable error of one-bit. The conventional art is designed to avoid an error-related suspension of decoding operations when a one-bit error pattern of a start code is detected.

FIG. 37 is a block diagram of a start code detector according to the conventional art. The start code detector comprises a bit pattern comparator 51 and a start code pattern generator 53. The bit pattern comparator 51 receives an incoming bit stream 50 and outputs a data effective signal 52. The start code pattern generator 53 issues a start code pattern 54.

The conventional start code detector of FIG. 37 tries to detect a start code successfully by using an error detection evading method with an error detection tolerable capacity of one bit in the following manner. The bit pattern comparator 51 constantly watches incoming bits on an incoming bit stream 50 to detect a start code. FIG. 38 shows a list of five-bit patterns including a start code "11010", for example, to be detected and its one-bit error patterns within the detection tolerable maximum capacity of one bit error. These one-bit error patterns differ from the start code pattern by one bit in different bit positions of the five-bit pattern.

The start code pattern generator 53 presents all the patterns in FIG. 38, for example, to the bit pattern comparator 51 for comparison. When a bit pattern on incoming data stream 50 is recognized as one of the patterns in FIG. 38, the bit pattern comparator 52 issues the data effective signal 52 for an effective period of the corresponding data.

Thus, the error detection evading method implemented in the conventional start code detector works with the detection tolerable capacity of one bit error. The conventional start code detector can perform a successful detection of a start code if the start code is erroneous by no more than one bit. In other words, an incoming bit pattern is examined not only with a correct start code pattern but with all of its one-bit error patterns in order to successfully detect a start code with a maximum of a one-bit error in its bit pattern.

The error detection may lead to a suspension of an operation. In this respect, the conventional start code detector is effective to evade error detection in a bit stream. However, the conventional start code detector is effective only under the specific condition that a single type of start code of fixed-bit length is used in the data stream. The conventional method of evading error detection can deal only with a single type of start code provided in a bit stream. Consequently, the conventional start code decoder cannot effectively deal with a data stream with two or more types of start codes which are to be detected or identified.

For example, a start code is defined as a specific coded word and used as a start delimiter of a layer as well as a starter of data in a coded data stream organized based on a digital video compression method which is prescribed in ISO/IEC 11172-2 (MPEG-1 video). This type of coded data stream contains two or more types of 32-bit start codes, each of which consists of a start code prefix followed by a start code value. The start code prefix is a string of unique twenty four bits which indicates a start code. The start code value is a string of eight bits which identifies the type of start code.

A start code in this type of coded data stream is detected or identified by recognizing the type of start code by the eight-bit start code value after detecting the unique twenty-four-bit start code prefix. The conventional detection error evading method with a detection tolerable capacity of one-bit error may be used to detect the unique start code prefix. However, the conventional method is of no use for the detection of a start code value which can be a plurality of values, some of which differ from one another by one bit. Application of the conventional method to a start code detection with this coded data stream may cause serious decoding damage in a decoder.

In the view of the foregoing problems, it is an object of the present invention to provide a decoder for decoding data in a coded data stream which can minimize video data damage by error detection of a start code or specific code word.

It is another object of the present invention to provide a decoder which tries to maintain an operation when detecting a start code or specific code word with minor or bit error by using the most similar replacement to the detected code of others.

It is a further object of the present invention to provide a decoder which can mask an error by limiting the area and period of error masking on the display when a detected error start code cannot be replaced.

It is a further object of the present invention to provide a data receiving apparatus which can minimize damage to video data by error detection.

It is a further object of the present invention to realize a data receiving method for minimizing error detection which can be implemented in a decoder for decoding data in a data stream or in a data receiving apparatus.

SUMMARY OF THE INVENTION

These and other objects are accomplished by the following aspects of the present invention.

According to one aspect of the present invention, an apparatus for receiving and decoding a bit stream of data blocks which are organized in a hierarchical order of layers, each of the data blocks corresponding to one of the layers and including a start code which identifies the layer of the data block may include a layer memory for storing data indicating the layer corresponding to the last start code received in the data stream, the layer memory having a last layer output, a start code detector, coupled to receive the bit stream and the last layer output, for detecting start codes by comparing data in the bit stream with a set of expected start codes, the set of expected start codes being selected responsive to the last layer output, the start code detector selecting one of the expected start codes as a detected start code, if one of the expected start codes is acceptably similar to data in the bit stream, the start code detector having a start code detector output which identifies the detected start code and its corresponding layer, means responsive to the start code detector output for updating the layer memory with data indicating the layer corresponding to the detected start code, and a block data decoder, responsive to the detected start code output from the start code detector, for decoding the data block corresponding to the detected start code.

The start code detector may include a unique pattern detector coupled to receive the bit stream and detect start code prefixes, the unique pattern detector having an output on which possible start codes corresponding to detected start code prefixes are placed, and a start code identifier, coupled to receive the output of the unique pattern detector and the last layer output from the layer memory, for comparing the possible start codes from the unique pattern detector with one or more expected start codes based on the last layer output, the start code identifier having a start code identifier output in a first state which indicates that an error has occurred, if no expected start code is acceptably similar to the possible start code, and in a second state which identifies the detected start code and the corresponding layer, if an expected start code is acceptably similar to the possible start code.

The block data decoder is responsive to the start code identifier output being in the first state for suspending block data decoding, and the apparatus may further include a display controller, the display controller responsive to the start code identifier output being in the first state to perform error masking corresponding to the error.

The apparatus may further include means for instructing the display controller to cease the error masking and instructing the block data decoder to resume block data decoding when the start code identifier next detects a start code corresponding to a layer which is the same as or higher in the layer hierarchy.

The start code detector may include a unique pattern detector coupled to receive the bit stream and detect start code prefixes, the unique pattern detector having a unique pattern detector output on which possible start codes corresponding to detected start code prefixes are placed, a first expected start code selector coupled to receive the last layer output from the layer memory, the first expected start code selector selecting and generating a first expected start code selector output identifying one or more expected start codes based on the last layer, a start code matching identifier, coupled to receive the unique pattern detector output and the first expected start code selector output, for comparing the possible start code from the unique pattern detector with the one or more expected start codes based on the last layer output, the start code matching identifier generating a replacement start signal output if the possible start code does not match any of the expected start codes, and a start code replacement unit, responsive to the replacement start signal output. The start code replacement unit may include a second expected start code selector for selecting one or more expected start codes based on the last layer, and generating an output indicating the expected start codes, a similarity calculator, coupled to receive expected start codes from the second expected start code selector and the possible start code, for calculating and generating an output indicating a Hamming distance of the possible start code to each of the expected start codes from the second expected start code selector, and a similarity based replacement identifier, coupled to receive the output of the similarity calculator, for selecting and generating a start code identifier output indicating the one of the expected start codes with the smallest Hamming distance to the possible start code.

The Hamming distances may be calculated by determining the number of bits of each of the expected start codes which do not match the corresponding bit of the possible start code.

The Hamming distances may be calculated for each expected start code by determining each bit of the expected start code which does not match the corresponding bit of the detected start code, weighting each of the bits based on its bit position to generate a weighted bit value and summing all of the weighted bit values.

The start code detector nay include a unique pattern detector coupled to receive the bit stream and detect start code prefixes, the unique pattern detector having a unique pattern detector output on which possible start codes corresponding to detected start code prefixes are placed, a first expected start code selector coupled to receive the last layer output from the layer memory, the expected start code selector selecting and generating a first expected start code selector output identifying one or more expected start codes based on the last layer output, a start code matching identifier, coupled to receive the unique pattern detector output and the first expected start code selector output, for comparing the possible start code from the unique pattern detector with the one or more expected start codes based on the last layer output, the start code matching identifier generating a replacement start signal output if the possible start code does not match any of the expected start codes, and a start code replacement unit, responsive to the replacement start signal output. The start code replacement unit may include a second expected start code selector for selecting one or more expected start codes based on the last layer and generating an output indicating the expected start codes, a priority assigning numerator, coupled to receive expected start codes from the second expected start code selector and to receive the last layer output, for calculating and generating an output indicating a probability of occurrence for each expected start code received from the second expected start code selector, and a priority based replacement identifier, coupled to receive the output of the priority assigning numerator, for selecting and generating a start code identifier output indicating the one of the expected start codes with tile highest probability of occurrence.

The priority assigning numerator output may indicate priority of each expected start code by a numerical value based on probability of occurrence relative to other expected start codes.

The priority assigning numerator output may indicate priority of each expected start code by its order of probability from most likely to least likely relative to other expected start codes without indicating actual probability of occurrence.

The start code detector may include a replacement determiner for selecting a detected start code from the expected start codes, the replacement determiner locally decoding the block data for a predetermined time period in accordance with a plurality of the expected start codes and detecting the number of decoding errors for the block data for each of the plurality of expected start codes and selecting as the detected start code a one of the plurality of expected start codes in which the fewest decoding errors were detected.

According to another aspect of the present invention, a method for receiving and decoding a bit stream of data blocks which are organized in a hierarchical order of layers, each of the data blocks corresponding to one of the layers and including a start code which identifies the layer of the data block. The method may include the steps of storing data indicating the layer corresponding to the last start code received in the data stream, continuously comparing data in the bit stream with a set of expected start codes, the set of expected start codes being selected responsive to the last layer, selecting one of the expected start codes as a detected start code based on the comparison, if one of the expected start codes is acceptably similar to data in the bit stream, updating the last layer data with data indicating the layer corresponding to the detected start code, and decoding the block data corresponding to the detected start code in accordance with the detected start code.

The comparing step may include detecting start code prefixes in the bit stream, and comparing start codes corresponding to the prefixes with one or more of the expected start codes.

The method may further include the steps of suspending block data decoding if a detected start code is not selected, and performing error masking if a detected start code is not selected.

The method may further include the step of ceasing the error masking and resuming block data decoding when a start code is detected corresponding to a layer which is the same as or higher in the layer hierarchy than the layer in which no selection was made.

The selecting step may include generating a replacement start signal if one of the expected start codes does not match the start code corresponding to the detected start code prefix, selecting one or more expected start codes based on the last layer, calculating a Hamming distance of the start code corresponding to the detected start code prefix to each of the expected start codes, and selecting as the detected start, code a one of the expected start codes with the smallest Hamming distance to the start code corresponding to the detected start code prefix.

The Hamming distance calculating step includes the step of determining the number of bits of each of the expected start codes which do not match the corresponding bit of the start code corresponding to the detected start code prefix.

The Hamming distance calculating step for each expected start code may include the steps of determining for each expected start code, each bit of the expected start code which does not match the corresponding bit of the start code corresponding to the detected start code prefix, weighting each of the bits based on its bit position to generate a weighted bit value, and summing all of the weighted bit values.

The method may further include the step of calculating a probability of occurrence for each expected start code if no expected start code identically matches the start code corresponding to the detected start code prefix, and selecting a one of said expected start codes with the highest probability of occurrence as the detected start code.

The selecting step may include the steps of generating a replacement start signal if one of the expected start codes does not match the start code corresponding to the detected start code prefix, selecting one or more expected start codes based on the last layer output, calculating a Hamming distance of the start code corresponding to the detected start code prefix to each of the expected start codes, calculating a probability of occurrence for each expected start code if no expected start code identically matches the start code corresponding to the detected start code prefix, and selecting as the detected start code a one of the expected start codes with the smallest value of W where, $$W=D[Pi(L)]-E[Pi(L)]$$

where

Pi(L) is an expected start code

D[Pi(L)] is the Hamming distance of the start code, and

E[Pi(L)] is the probability of occurrence of the expected start code.

The selecting step may include the steps of locally decoding block data corresponding to a detected start code prefix for a predetermined time period in accordance with a plurality of the expected start codes, detecting the number of decoding errors for the block data for each of the plurality of expected start codes, and selecting as the detected start code a one of the plurality of expected start codes in which the fewest decoding errors were detected.

BRIEF DESCRIPTION OF THE DRAWINGS

In the drawings;

FIG. 4 shows a list of start codes which occur in a bit stream of the MPEG-1 video data in FIG. 2 or 3;

FIG. 10 shows a table of layer based expected start codes to be detected in the decoder of FIG. 5;

FIG. 22 shows an evaluation memory table of expectation of occurrence of layered expected start codes in the priority assigning numerator in FIG. 21 according to this embodiment;

FIG. 23 shows another example of the evaluation memory table in FIG. 22 according to this embodiment;

FIG. 24 shows another example of the evaluation memory table in FIG. 22 according to this embodiment;

FIG. 25 shows an evaluation memory table of expectation of occurrence in priority order of layer based expected start codes in a priority assigning numerator in a decoder of the present invention according to another embodiment;

FIG. 30 shows a table of decoding period time required for data in different layers according to this embodiment;

FIG. 33 shows a list of layer based expected start codes which occur in a bit stream of MPEG-2 video data to be detected in a decoder of the present invention according to another embodiment;

FIG. 35 shows a table of layer based expected start codes in the bit stream of MPEG-1 system data in FIG. 34 according to this embodiment;

DETAILED DESCRIPTION OF PREFERRED EMBODIMENTS OF THE INVENTION

Embodiment 1

Figure 1:
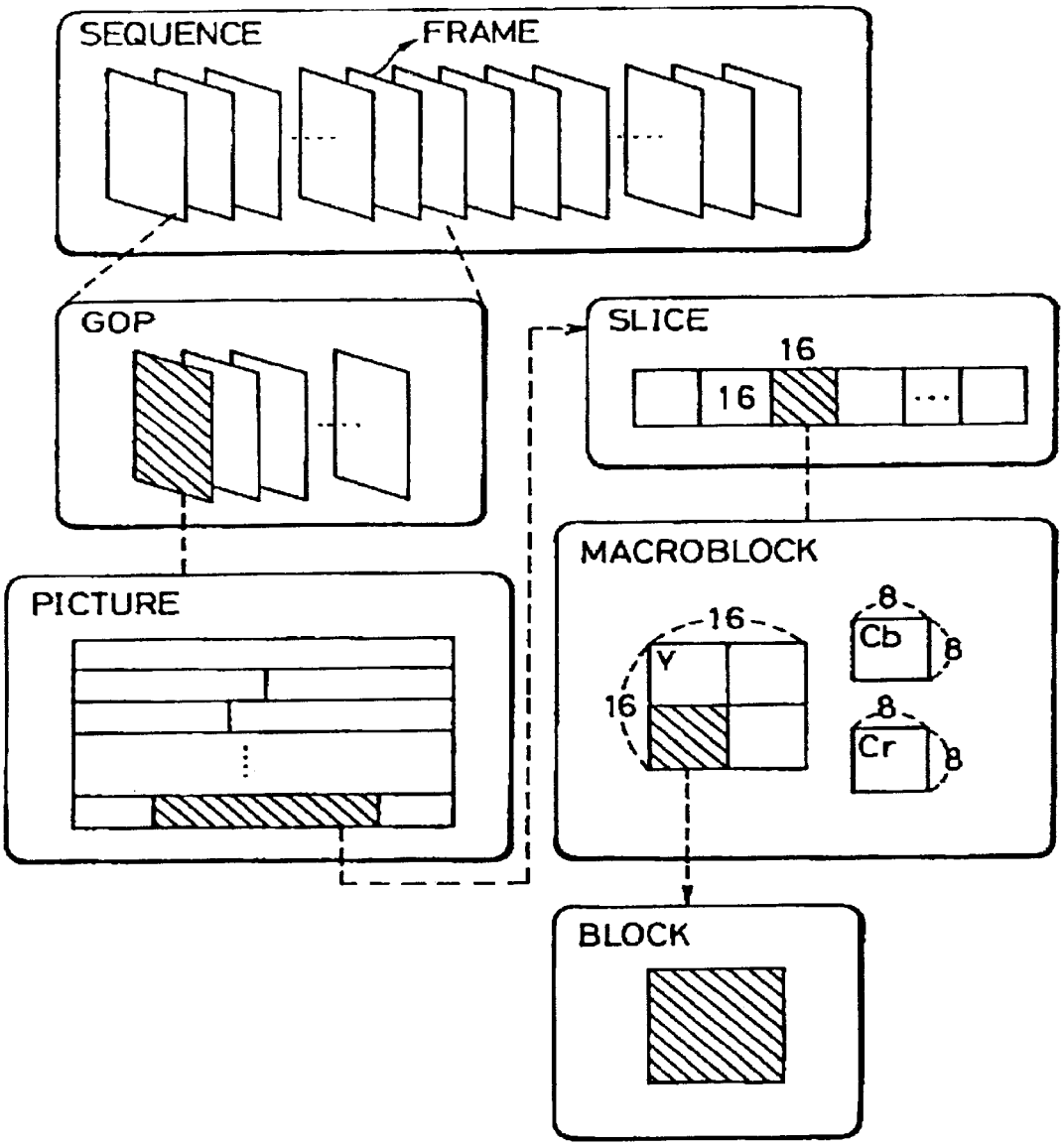
FIG. 1 illustrates a decomposition of a video sequence of MPEG-1 video data to be decoded in a decoder of the present invention according to one embodiment.

FIG. 1 shows a decomposition of a video sequence of MPEG-1 video data with different data elements in layers. A decoder of the present invention is intended primarily to decode digital video data in a layered bit stream according to the method prescribed by ISO/IEC 11172-2 (MPEG-1).

With reference to FIG. 1, a video sequence consists of one or more groups of pictures or GOPs. A GOP is a series of one or lore pictures. A picture contains one or more slices. A slice is a series of two or more macroblocks. A macroblock is a plurality of blocks. Thus, digital video data are organized by hierarchical levels of data or in layers. A top level in hierarchy in the video sequence is a sequence layer. The next level in the hierarchy is a GOP layer followed by a picture layer. A picture layer is followed by a slice layer. A macroblock layer follows a slice layer and the lowest level in the hierarchy is a block layer following a macroblock layer.

Figure 2:
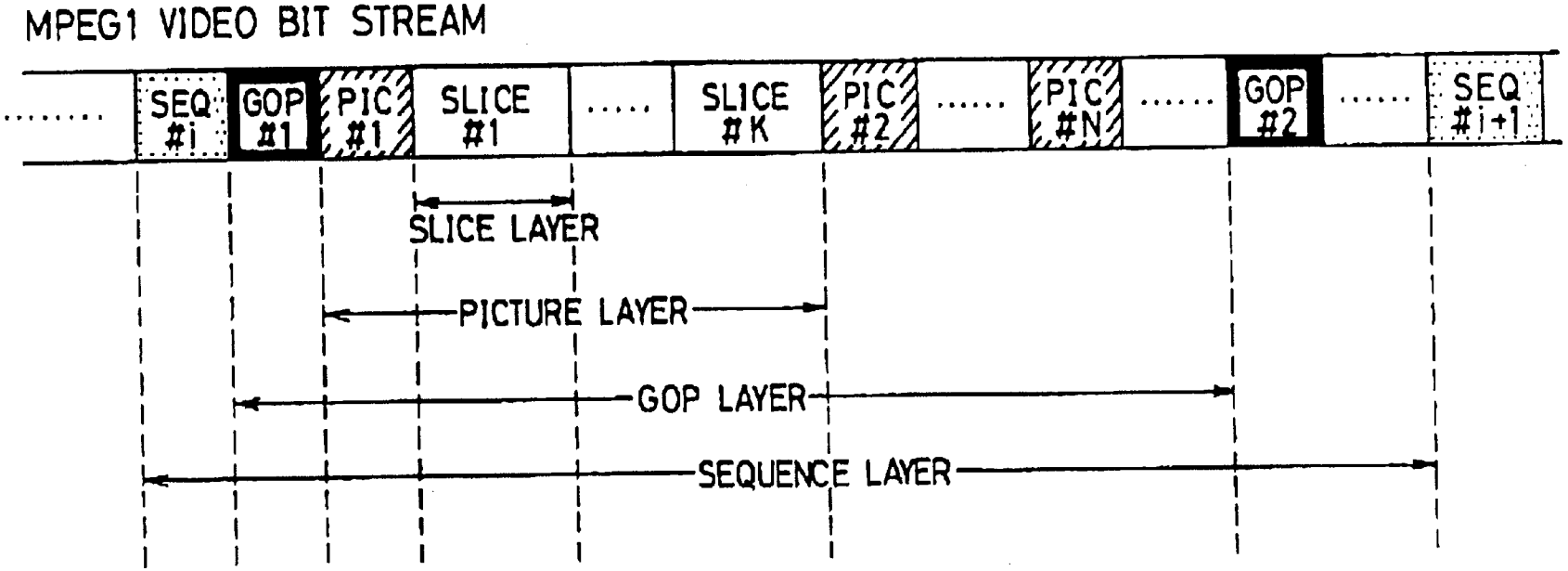
FIG. 2 shows a bit stream organization of the MPEG-1 video data in FIG. 1.
Figure 3:
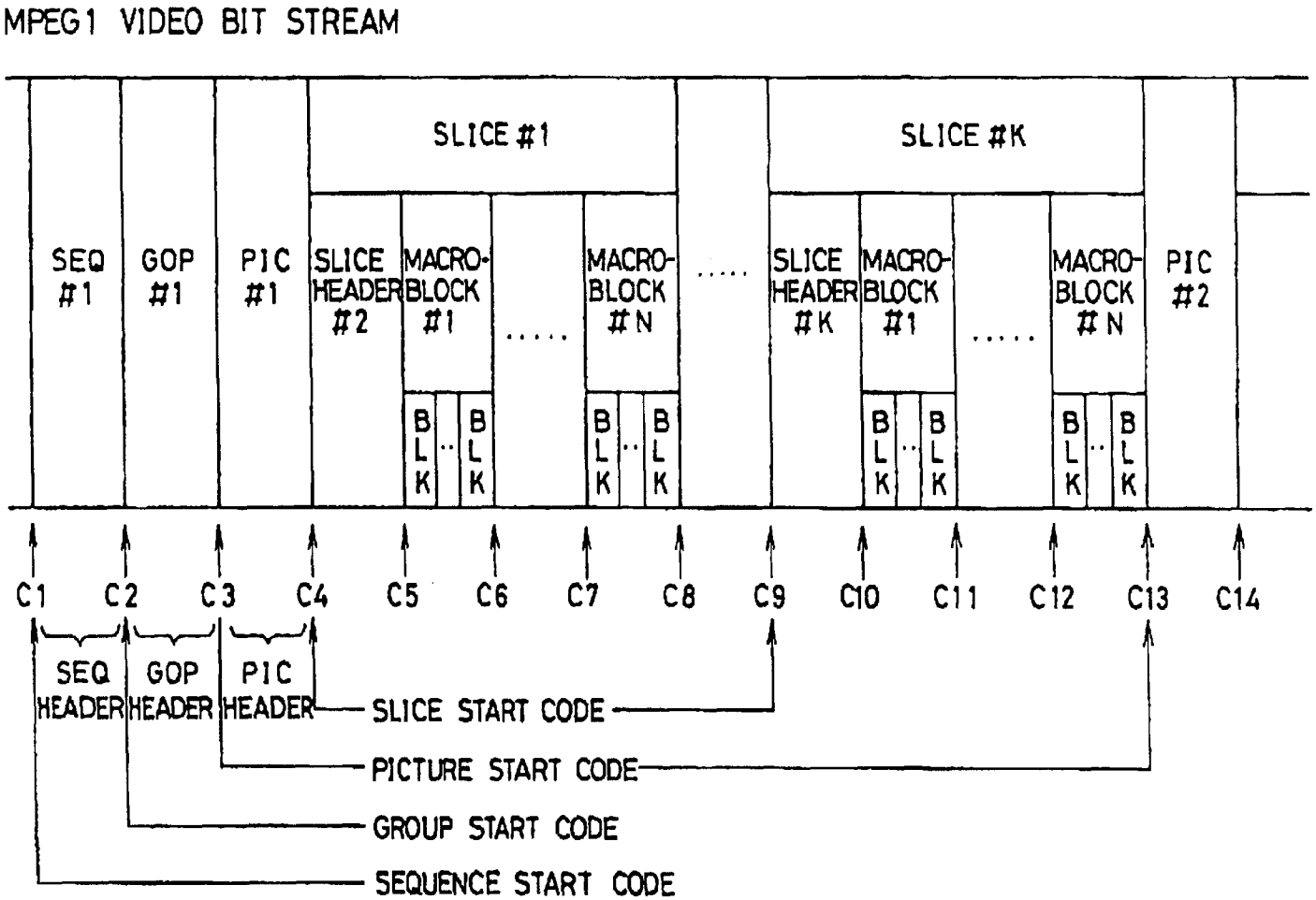
FIG. 3 shows a part of the MPEG-1 video bit stream in FIG. 2 in more detail.

A bit stream of coded video data decoded in the inventive decoder is organized in layers based on this hierarchy as shown in FIGS. 2 and 3.

Referring to FIG. 2, a bit stream is a series of one or more consecutive sequence layers. As the figure shows, a sequence layer includes all of the lower layers. The other layers include all of their lower layers based on the layered organization of a bit stream stated above.

FIG. 3 details the layered bit stream in FIG. 2 illustrating different types of start codes and headers corresponding to different layers. As the figure illustrates, each layer commences with a start code as a specific code word, except for macroblock and block layers which contain no start codes. A bit stream or a sequence layer commences with a sequence header with a sequence_start_code in the front. A GOP layer commences with a GOP header with a group_start_code in the front. A picture layer commences with a picture header with a picture_start_code in the front. A slice layer commences with a slice header with a slice_start_code in the front. Finally, a bit stream is ended with a sequence_end_code. FIG. 4 is a list of start codes which may occur in a bit stream and their bit strings in hexadecimal including the sequence_end_code. Referring to the figure, there are two types of start codes which are not illustrated in the layered bit stream in FIG. 3, an extension_data_start_code and a user_data_start_code, with which extension data and user data are commenced respectively. These data can be predefined as required in each of the sequences, GOP and picture layers for providing optional data.

Consequently, a layered bit stream of MPEG-1 video data is organized under such a consistent form that incoming data can be predicted in a bit stream. Specifically, sequence data can be followed by GOP data, extension data or user data, GOP data can be followed by picture data, extension data or user data. Picture data can be followed by slice data, extension data or user data. Slice data can be followed by slice data, picture data, GOP data or sequence data. No other data can occur in a bit stream of MPEG-1 video data.

Figure 5:
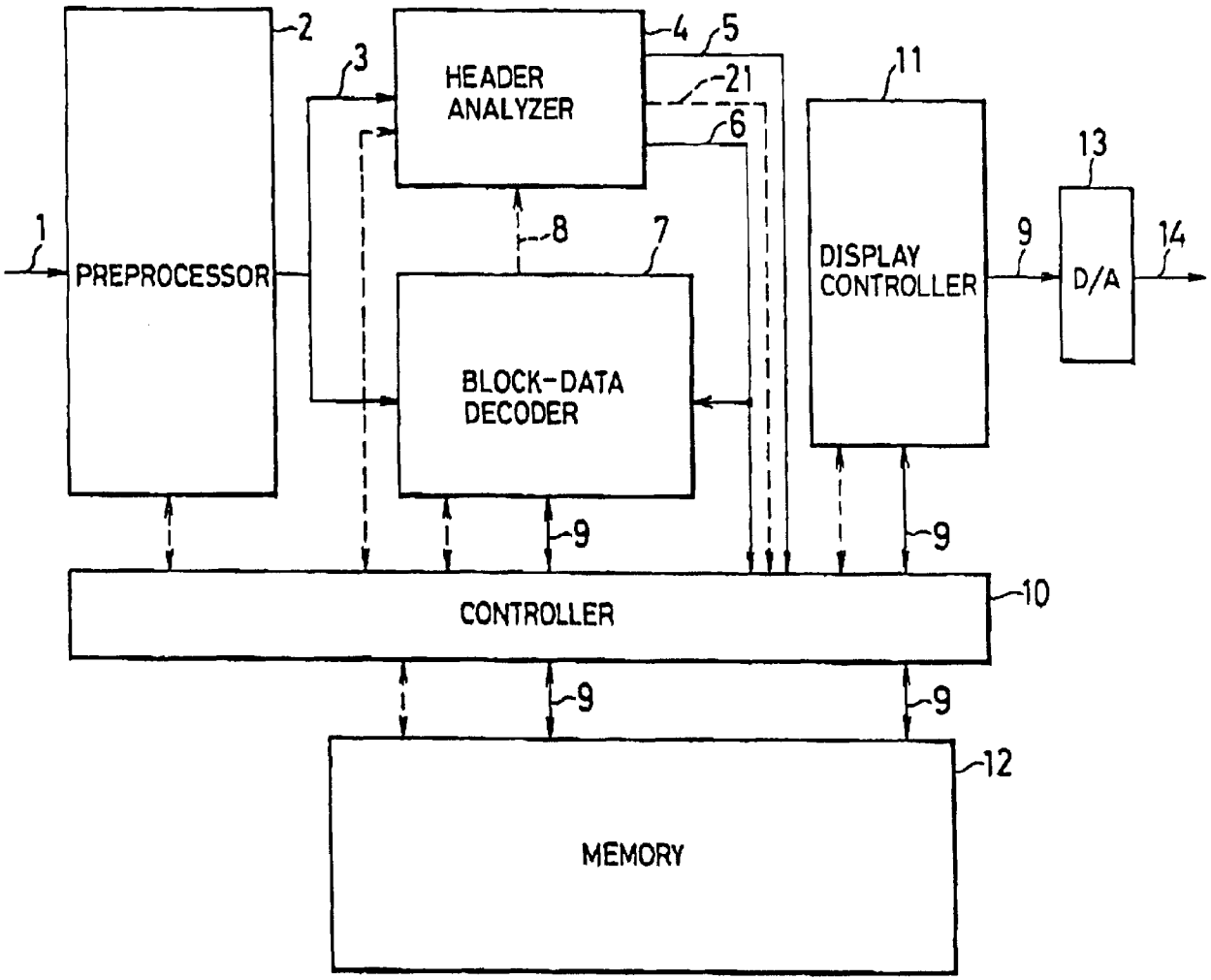
FIG. 5 shows a block diagram of the decoder according to this embodiment.

FIG. 5 shows a block diagram of a decoder according to one embodiment of the present invention. Referring to the figure, the decoder has a preprocessor 2, a header analyzer 4, a block-data decoder 7, a controller 10, a display controller 11, a memory 12, and a digital/analog (D/A) converter 13. An incoming bit stream 1 is input to the decoder through an external transmission line. The preprocessor 2 outputs preprocessed data 3. The header analyzer 4 outputs layer information 5. The block-data decoder 7 outputs digital video data 9. The controller 10 controls operations in the decoder. The D/A converter 13 outputs analog video data 14. A solid line with an arrow or arrows in the figure indicates a direction or directions of a data flow. A dashed line with an arrow or arrows indicates a direction or directions of the flow of a control signal.

Figure 6:
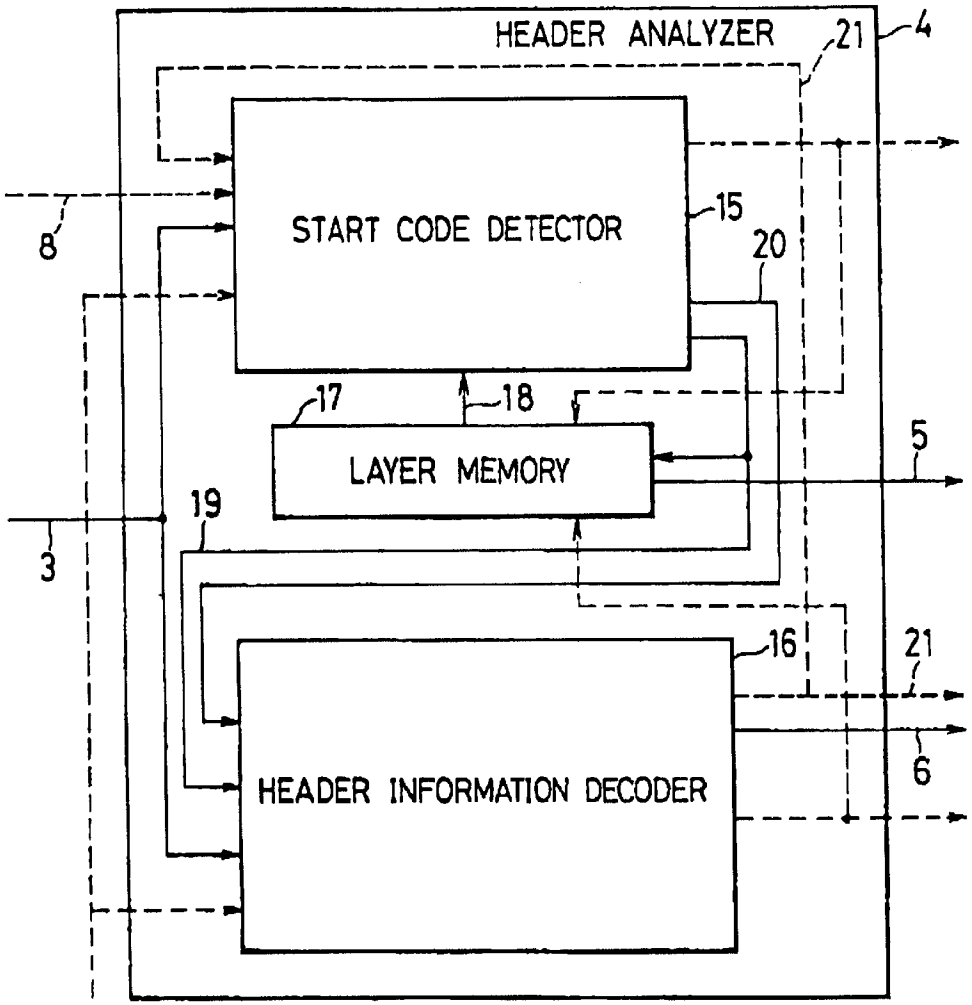
FIG. 6 shows a block diagram of a header analyzer of the decoder in FIG. 5.

FIG. 6 shows a block diagram of the header analyzer 4 in FIG. 5. Referring to FIG. 6, the header analyzer 4 has a start code detector 15, a header information decoder 16 and a layer memory 17. The header information decoder 16 decodes a series of data in each header of a sequence header, a GOP header, a picture header and a slice header and microblock data except block data.

A series of decoding operations performed in the inventive decoder of this embodiment are now described with reference to FIGS. 5 and 6.

When input data in the incoming bit stream 1 through a transmission line, the preprocessor 2 buffers a certain amount of bits of the data. The preprocessor 2 then adjusts a processing speed for the buffered bits by absorbing a speed difference between a transmission speed with which the bits are transmitted and a decoding speed with which the bits will be processed in the decoder. The preprocessor 2 also separates a processing unit of fixed-bit pattern or the preprocessed data 3 from the buffered bits in accordance with a control signal from the controller 10. The preprocessed data 3 is output to the header analyzer 4 and the block-data decoder 7.

An operation of the decoder starts when the sequence_start_code, a start delimiter of a sequence layer, is detected in the header analyzer 4 after the decoder has been initialized or a software is reset.

In a normal decoding operation, the start code detector 15 in the header analyzer 4 constantly watches the preprocessed data 3 to detect a start code. When a start code is detected and identified by the type, the start code detector 15 issues layer information 19 and start code information 20 based on a detected start code. The layer information 19 is input to the layer memory 17 for storage and also to the header information decoder 16 for informing of the type of layer of the detected start code. The start code information 20 is input in the header information decoder 16 to inform of the type of start code detected. The header information decoder 16 decodes header data elements of the preprocessed data 3 corresponding to the detected start code based on the layer information 19 and the start code information 20. Consequently, the header information decoder 16 outputs decoded header information 6. The decoded header information 6 can be used as required in the controller 10 or other units in the decoder for controlling decoding or displaying.

When completed decoding of a series of header data from a sequence header through a slice header in a bit stream, the header information decoder 16 issues a header decoding end signal 21 to the start code detector 15 and the controller 10. In reception of the header decoding end signal 21, the controller 10 starts the block-data decoder 7 when receiving the header decoding end signal 21. The block-data decoder 7 decodes digital video data in the preprocessed data 3 corresponding to the header information analyzed in the header analyzer 4 based on a MPEG-1 video reconstruction algorithm. Consequently, decoded digital video data 9 in the block-data decoder 7 are stored in the memory 12 and can be read as required by the block-data decoder 7 or the display controller 11. A series of normal decoding operations discussed here are executed in synchronization.

When a start code pattern with a substantial error (i.e., an error of sufficient magnitude that a normal decoding operation is not maintainable) is detected, the start code detector 15 informs the controller 10 by a control signal. Further, the start code detector 15 informs the controller 10 of the layer in which the substantial error was detected. The layer in which the substantial error was detected can be informed by latest layer information 18 which is stored in the layer memory 17 of the previously detected start code. When a substantial error is detected by the start code detector 15, the controller 10 assumes that the start code detector 15 has been desynchronized and resets the synchronization of the decoder 15 based on the layer with the substantial error or the latest layer information 18. Further, the controller 10 requests the display controller 11 to give an optimal error masking to the corresponding area of the video image in a frame on the display which is based on the layer in which the substantial error detection occurred until the decoder recovers proper synchronization.

Synchronization can be recovered through the following process: The start code detector 15 selects start codes as a signal for synchronization based on a layer in which a substantial error was detected. The start code detector 15 discards all the subsequent data until the selected start codes. In the meantime, all the decoding operations in the decoder are suspended. The display controller 11 continues the optimal error masking for an error area required by the controller 10. A detailed discussion of the resynchronization will be made later.

Figure 7:
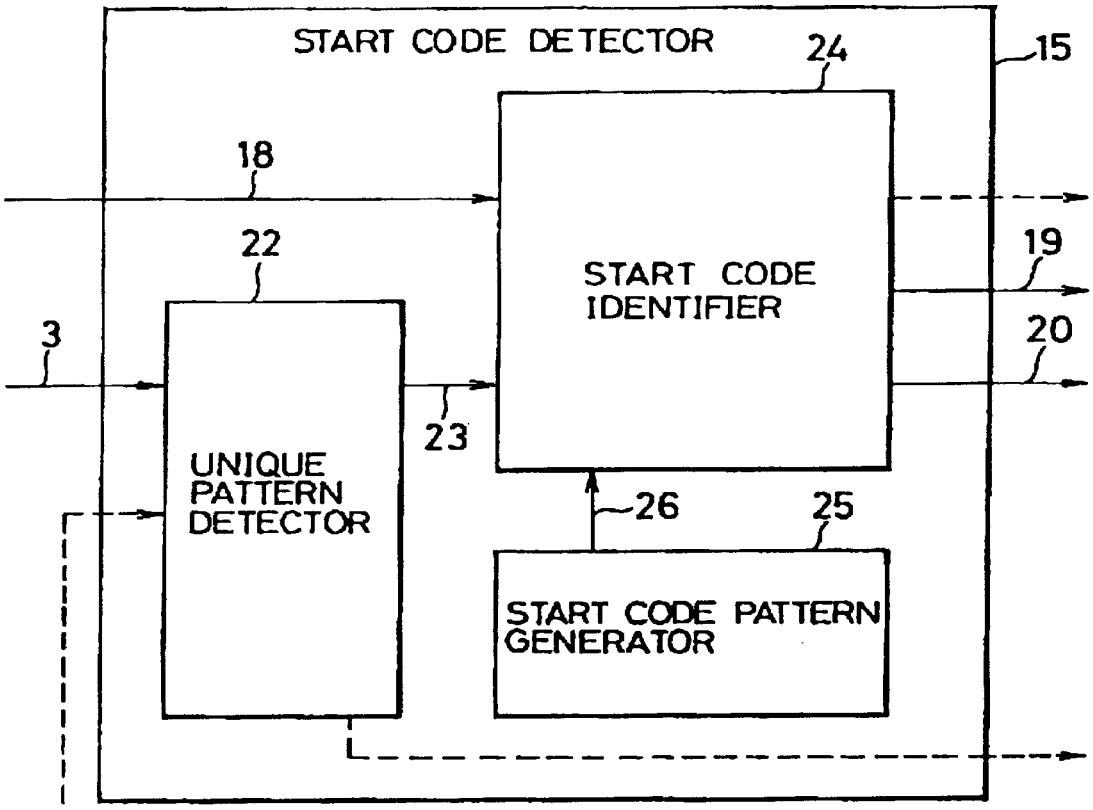
FIG. 7 shows a block diagram of a start code detector in the header analyzer of FIG. 6.
Figures 8, 9:
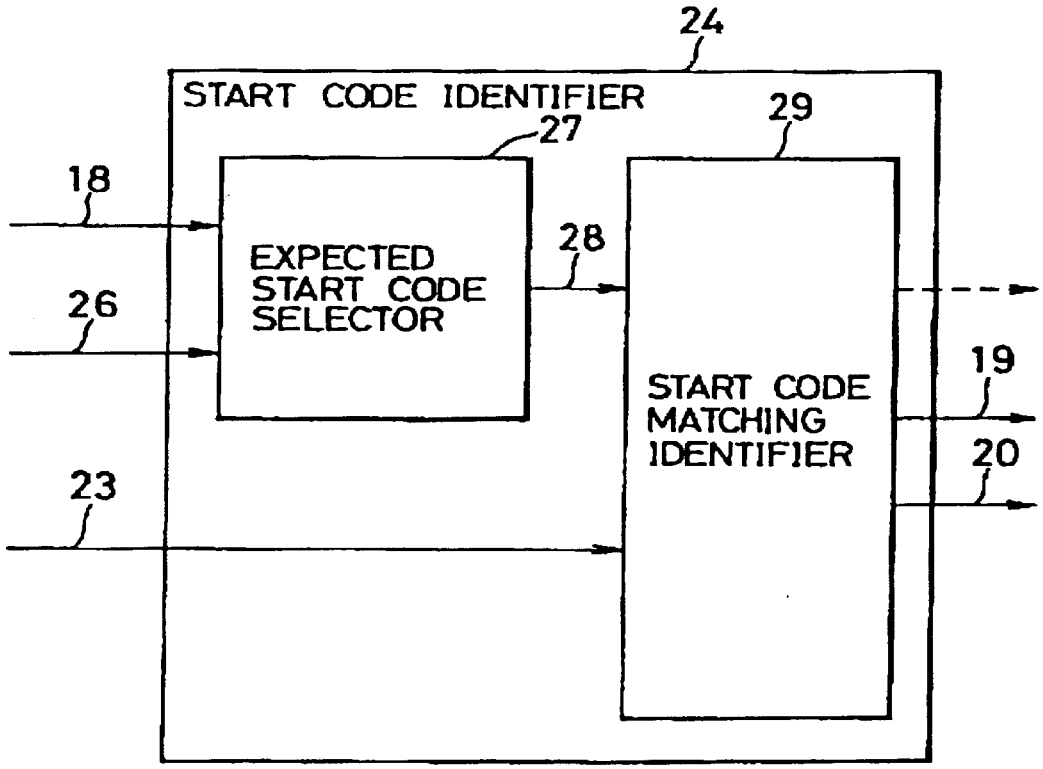
FIG. 8 shows a list of start codes to be detected in the decoder in FIG. 5.
FIG. 9 shows a block diagram of a start code identifier in the start code detector of FIG. 7.

FIG. 7 shows the start code detector 15 in the header analyzer 4 in FIG. 6. Referring to the figure, the start code detector 15 has a unique pattern detector 22, a start code identifier 24 and a start code pattern generator 25. The unique pattern detector 22 detects unique bit patterns in tire preprocessed data 3 output from the preprocessor 2. FIG. 8 shows start codes of start delimiters of layers listed in FIG. 4. The start code detector 15 is to detect all types of start codes listed in FIG. 4.

The unique pattern detector 22 watches incoming bits of the preprocessed data 3 to detect a unique 24-bit pattern "000001 in hexadecimial" or a start code prefix, indicating a start code, common to all types of start codes in FIG. 4. If the unique pattern detector 22 does not detect a start code prefix, it discards the preprocessed data 3 and observes the next incoming bits of the preprocessed data 3 for a start code prefix.

When the unique pattern detector 22 detects the unique 24-bit pattern in the incoming bits of the preprocessed data 3, it sends to the start code identifier 24 as a start code candidate 23 a 32-bit start code pattern comprising the detected unique 24-bit pattern followed by an eight-bit pattern.

The start code identifier 24 compares the eight-bit pattern of the start code candidate 23 with a start code pattern 26 generated in the start code pattern generator 25. As a result, the start code identifier 24 identifies the start code candidate 23 as one of the start codes listed in FIG. 4. Further, the start code identifier 24 examines and decides the propriety of the identified start code based on the place in the bit stream that the start code is detected.

The identified start code should be appropriate if it is the sequence_start_code detected in an initialized stage or a reset stage of the decoder. The identified start code should be appropriate, otherwise, if it is one of the start codes listed in FIG. 8 of a start delimiter of layer when detected in a normal operation of the start code detector 24.

A start code identifying operation in the start code identifier 24 win be discussed later in more detail.

When the identified start code is appropriate the start code identifier 24 finally issues layer information 19 and start code information 20 based on the identified start code. The layer information 19 is input and stored in the layer memory 17 and also input in the header information decoder 16. The start code information 20 is input in the header information decoder 16. Consequently with these two pieces of information, the header information decoder 16 starts its operation.

When a start code is detected with a substantial error, the start code identifier 24 informs the controller 10 by a control signal of the substantial error, with which a normal decoding operation will not be maintained, and of the layer where the substantial error occurred.

Now, a series of start code identifying operations are detailed with reference to FIGS. 7, 9 and 10. FIG. 9 shows the start code identifier 24 of FIG. 7 in further detail. Referring to FIG. 9, the start code identifier 24 has an expected start code selector 27 and a start code matching identifier 29.

FIG. 10 is a table of layer based expected start codes. According to this embodiment, a start code detection is accomplished by making an effective use of the characteristic layered structure of an MPEG-1 video bit stream. A start code to be detected can be predicted based on the latest layer information which represents the layer of the previously detected start code. The table of layer based expected start codes in FIG. 10 is based on the bit stream organization of MPEG-1 video data.

With reference to FIG. 9, the expected start code selector 27 stores the table of layer based expected start codes in FIG. 10. The expected start code selector 27 selects a group of expected start codes based on the latest layer information 18 and the table in FIG. 10. The group of layer based expected start codes are output as expected start codes 28 to the start code matching identifier 29. The start code matching identifier 29 compares the start code candidate 23 with each of the expected start codes 28 to identify the start code candidate 23. When the start code candidate 23 does not match any of the expected start codes 28, but does match one of the other start codes in FIG. 4, the start code candidate 23 is determined to be an error code. Thus, an advantageous feature of this embodiment is that a detected start code is identified effectively with limited choices of expected start codes on a layer basis.

For example, when the latest layer information 18 indicates that the latest layer was a sequence, the expected start codes 28 according to the table in FIG. 10 are the GOP_start_code, the extension_data _start_code and the user_data_start_code. When the start code candidate 23 matches one of the expected start codes 28 in this case, the start code matching identifier 29 identifies the start code candidate 23 as an appropriate start code to be detected. When the start code candidate 23 matches none of the expected start codes 28 and denotes, for example, one of the picture_start_code, the slice_start_codes or the sequence_start_code, the start code matching identifier 29 identifies the start code candidate 23 as an error code.

When the start code candidate 23 is identified as an appropriate start code to be detected, the start code matching identifier 29 issues the layer information 19 and the start code information 20. With the layer information 19, the latest layer information in the layer memory 17 is updated as required. With the layer and start code information 19 and 20, the header information decoder 16 starts its operations and decodes header data following the identified start code as described earlier.

Figure 11:
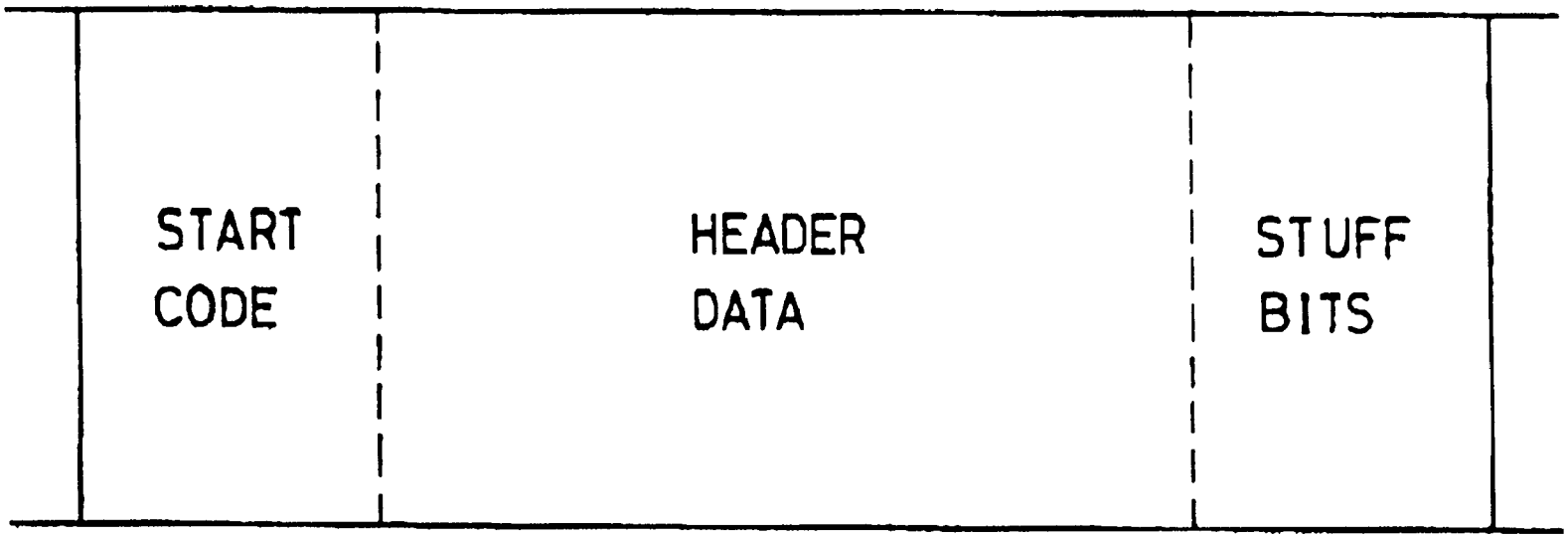
FIG. 11 shows the contents of a header to be analyzed in the header analyzer of FIG. 6.

FIG. 11 illustrates a header which has a start code in the front followed by a series of header data and stuff bits or nondata bits as required. The header information decoder 16 decodes a series of header data following the start code in a header. The header information decoder 16 starts decoding header data when a start code is identified, and stops decoding at the end of the header data in a header or when a nondata bit occurs. At this stage, the header information decoder 16 issues the header information decoding end signal 21 to the start code detector 15. The header information decoding end signal 21 informs the start code detector 15 of a ready state of the header information decoder 16 for decoding another header or another start code to be detected, unless the header was a slice header. If the header was a slice header, decoding in the header information decoder 16 extends continuously to other layers, i.e., macroblock and block layers. In such a case, the header information decoder 13 suspends decoding at the end of block-data in a block layer until another start code is detected in the start code detector 15.

When a substantial error code is detected, the start code detector 15 assumes that the operation is desynchronized and tries to resynchronize itself to the incoming data bits in order to recover its normal operation. The resynchronization process includes error masking in the decoder. A series of resynchronizing operations involving error masking in the decoder are now detailed.

The start code detector 15 tries to synchronize itself to the incoming bits on a layer basis with MPEG-1 video data using a start code as a synchronization signal for resynchronization. A start code can serve to help synchronize the start code detector 15 for the bit synchronization operation. A start code has conventionally been used as a starter signal of a data effective signal for decoding, which can prove that data following a start code are effective. Consequently, data in a layer where a substantial error code has been detected are considered ineffective. The start code detector 15 discards data after the substantial error detection until it detects an optimal start code as a start delimiter of a layer and recovers synchronization. A start code used as the synchronization signal should be a start delimiter of the same layer as that in which a substantial error was detected. Next most preferably, the start code selected for the signal should be a start delimiter of the closest layer type which is higher than the layer with the error detection according to the hierarchy of a layered bit stream of MPEG-1 video data. In other words, it is desirable to recover synchronization in a bit stream as early as possible in order to shorten the period of time that the start code detector is desynchronized in order to minimize the possible damage to the video data. A start code of a sublayer or a lower level layer than that in which the error was detected can not be considered a synchronization signal. Data in a sublayer or a lower layer are likely to be affected and damaged by the error in the higher level layer. In this respect, if, for example, a slice layer has an error detection with the start code detector 15 desynchronized it is ideal to reset the desynchronization of the detector with the slice_start_code in the next slice layer.

Figure 12:
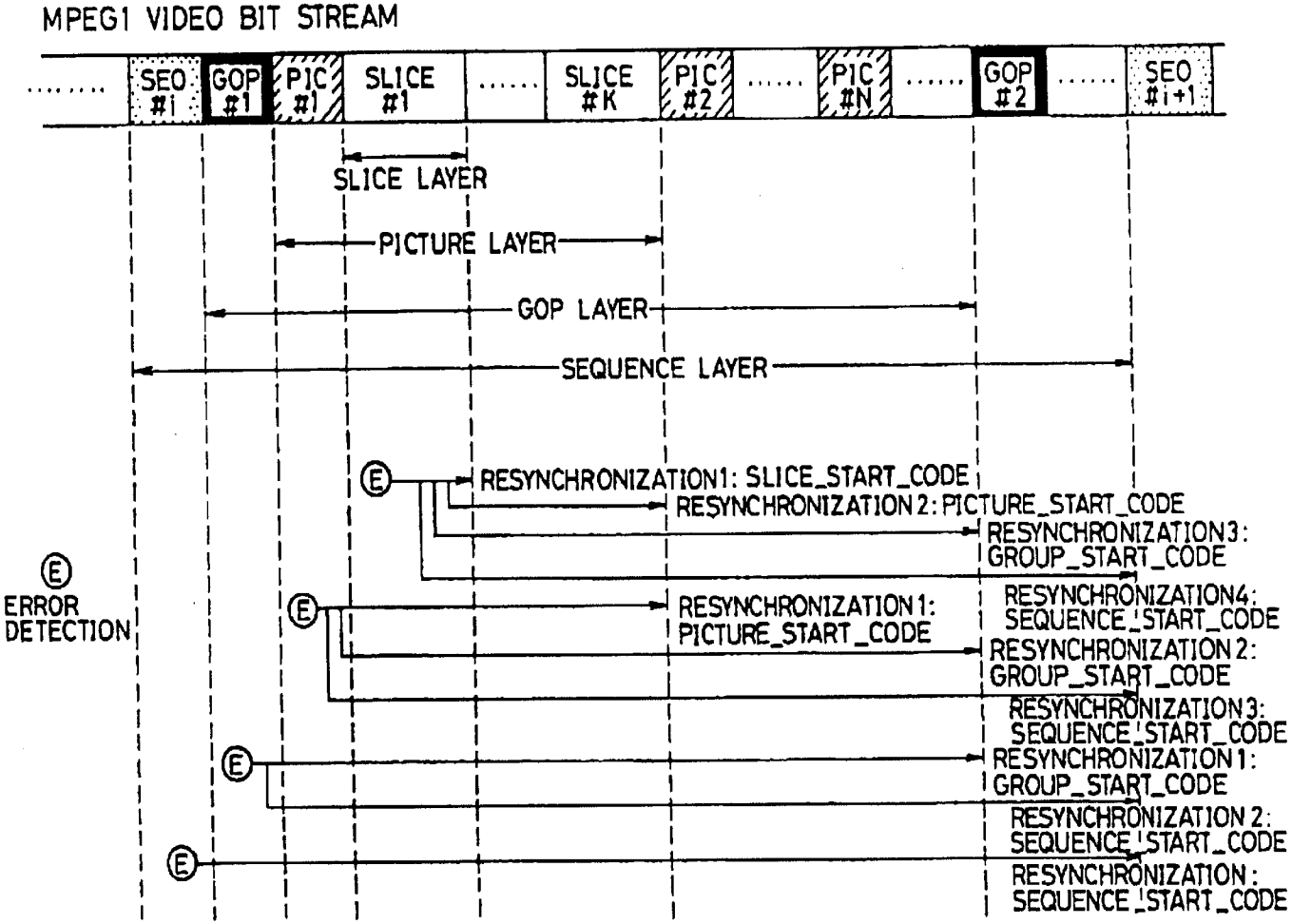
FIG. 12 shows layer based different cases of error detection in a bit stream of MPEG-1 video data illustrating the possible cases of resynchronization in accordance with a layer of error detection in the decoder of FIG. 5 according to this embodiment.

FIG. 12 illustrates the above discussion in more detail. FIG. 12 shows the different layers in which errors may be detected and the corresponding possible choices of start codes as a synchronization signal in a preference or recommended order. As illustrated, when an error detection occurs in a slice layer, for example, there are four choices of resynchronization start codes, namely, slice_start_code, picture_start_code, group_start_code, and sequence_start_code in preference order. The start code detector can resynchronize itself to the incoming data bits 5 when any of the four start codes is detected in order to recover its normal decoding operation.

In the case of a picture layer, for example, a normal decoding operation can be recovered when any of the picture_start_code, the group_start_code and the sequence_start_code is detected in order of preference.

Thus, the start code detector 15 resynchronizes itself using a start code as a synchronization signal. The specific code used for resynchronization is selected based on the layer of the detected error, as shown in FIG. 12.

While resynchronizing operations are occurring, error masking is implemented in the display controller 11. Error masking is maintained until a start code as a synchronization signal is detected. The display controller 11 tries to smooth an error damaged area in a frame on the display by using a pseudo-image with the following error masking techniques discussed below. The display controller 11 may mask error with a patching technique using a pseudo-image by borrowing the image neighboring an error damaged image in the same image frame when those images are considered similar to each other. The display controller 11 may mask error with a replacement technique using a pseudo-image made from previously processed decoded image data stored in the memory 12 for reference. When images in an error damaged area are considered the same or similar to the area of the same image address in a previous frame of the decoded image data stored in the memory 12, the damaged area images can be replaced with the image information of the corresponding area in a previous frame.

Error masking lasts from the detection of an error start code pattern with the start code detector until recovery of synchronism in the start code detector. The range or area of error masking in a bit stream or video data varies depending on the layer in which the error was detected, as FIG. 12 illustrates. Referring to the figure, when an error start code pattern is detected in a sequence layer, error masking will last until detection of the sequence_start_code in the next sequence layer. An error in the sequence layer results in the longest case of error masking. In this case, the display controller 11 can implement an image freeze technique on the display to cover an error damaged area. With an error detection in a picture layer, error masking will be maintained until the picture_start_code or a start code of a higher level layer is detected. In this case, the image freeze technique can also be implemented to cover the error area. With an error detection in a slice or a lower level layer, e.g., a macroblock layer or a block layer, error masking is maintained until any start code listed in FIG. 8 is detected. In this case, it is effective to use a slice_start_code as a synchronization signal, which will result in the shortest error masking period. Error masking in this case can be implemented with the replacement technique stated earlier, in which a pseudo-image for a part or all of the slice is constructed using previously processed decoded image data stored in the memory 12 to replace the error damaged image. Otherwise, error masking is implemented with the patching technique stated earlier, in which a pseudo-image is made by borrowing the image neighboring an error damaged image. Decoded image data used for masking an error are sent from the memory 12 to the display controller 11 via the controller 10. The controller 10 informs the display controller 11 of an error masking area by a control signal. The display controller 11 performs error masking in the error masking area.

Thus, the decoders according to this embodiment can achieve effective error masking of video data on the display when an erroneous start code pattern is detected. The error masking is implemented by limiting the area of error masking during a resynchronizing operation with an optimal start code as a synchronization signal selected based on a layer with the error detection.

Figure 13:
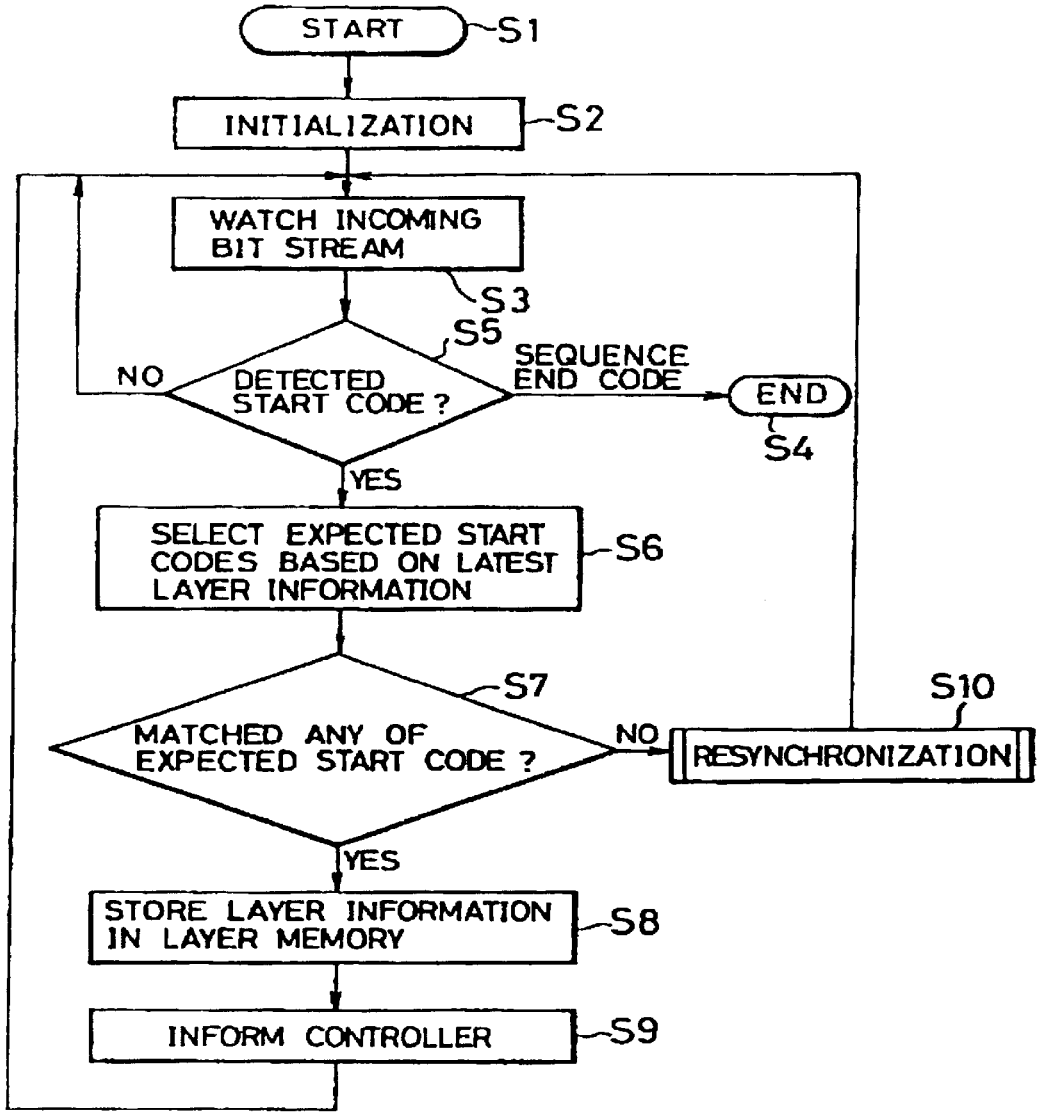
FIG. 13 is a flowchart illustrating a start code detecting and identifying operation in the start code detector according to this embodiment.

FIG. 13 is a flowchart of a start code detecting process in the start code detector 15 according to this embodiment. A series of start code detecting operations can now be summarized in the following operating steps:

S1 A start code detecting operation starts in the start code detector 15 when the power is supplied in the decoder.

S2 A start code detecting operation in the start code detector is initialized. The layer memory is initialized with a null code, for example, which indicates no layer information stored yet in the layer memory. The sequence_start_code is set as the initial start code which is to be detected in a bit stream by the start code detector 15.

S3 The incoming bit stream is constantly watched in the start code detector 15 to detect a start code pattern.

S5 When a start code pattern is detected, the operating step proceeds to S6.

S4 When the sequence_end_code is detected, the operating step in the start code detector 15 terminates.

S6 A group of layer based expected start codes corresponding to a detected start code pattern are selected in accordance with the latest layer information in the layer memory.

S7 The detected start code pattern is compared with each of the layer based expected start codes to identify the type of a start code.

S8 When the detected start code pattern matches one of the layer based expected start codes, data of the latest layer information stored in the layer memory is updated based on the identified start code, and the operating step proceeds to S9.

S10 When the detected start code pattern matches none of the layer based expected start codes, the operating step enters into a resynchronization process. When the process is completed with a synchronization recovered in the start code detector, the operating step goes back to S3 to detect a start code.

S9 The controller 10 is informed of the latest layer information which was updated in S8, which terminates a series of start code detecting operations. Then the start code detector 15 starts to watch again the incoming data bits to detect a start code. The operating step goes back to S3.

Figure 14:
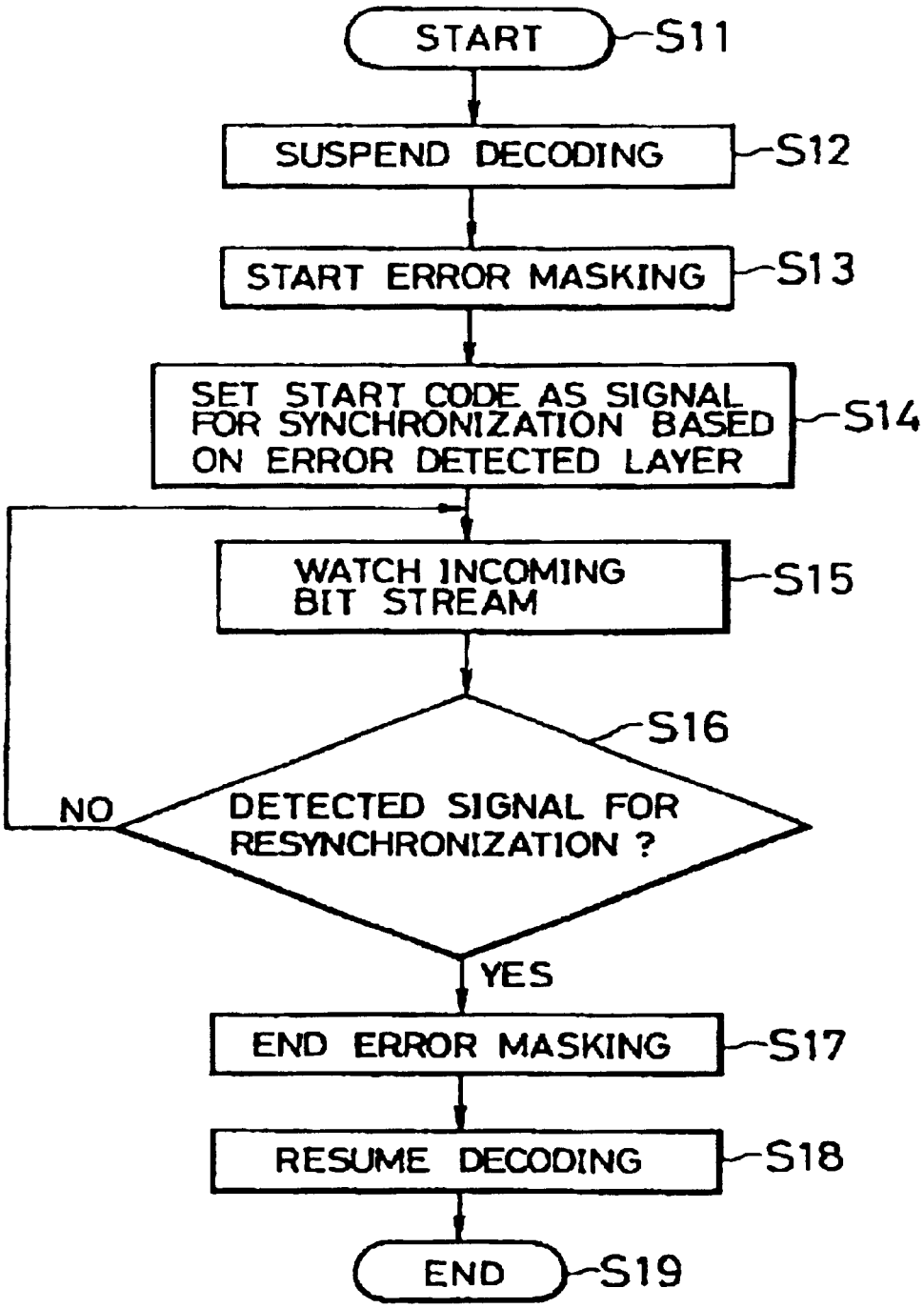
FIG. 14 is a flowchart illustrating a resynchronizing operation of S10 in FIG. 13 according to this embodiment.

FIG. 14 is a flowchart illustrating the resynchronization process in S10 of FIG. 13 in more detail. A series of resynchronizing operations are now summarized in the following operating steps:

S11 The resynchronizing process commences when the detected start code pattern matches none of the layer based expected start codes in S10 of FIG. 13.

S12 Decoding operations in the header information decoder 16 and the block-data decoder 7 are suspended.

S13 Error masking is implemented in the display controller.

S14 A start code is selected as a synchronization signal based on the layer corresponding to the detected error and set for resynchronization in the start code detector.

S15 The incoming data bit stream is watched in the start code detector in order to detect a start code corresponding to the resynchronization signal.

S17 When a start code corresponding to the signal is detected in S16 or the start code detector can manage to resynchronize itself, the error masking terminates.

S18 Decoding operations in the header information decoder 16 and the block-data decoder 7 resume. This terminates the whole process of the resynchronizing operation.

Embodiment 2

With further reference to the start code detecting operation discussed in the previous embodiment, a decoder of the invention can be designed to avoid an error-related suspension of decoding operations when the detected error is minor or a bit error. According to this embodiment, when a detected start code pattern is identified as none of the layer based expected start codes in the start code identifier, the decoder replaces the erroneous detected start code pattern with the most appropriate start code of all the layer based expected start codes in order not to suspend decoding operations in the decoder. Decoding will be maintained based on the replacement start code.

Figure 15:
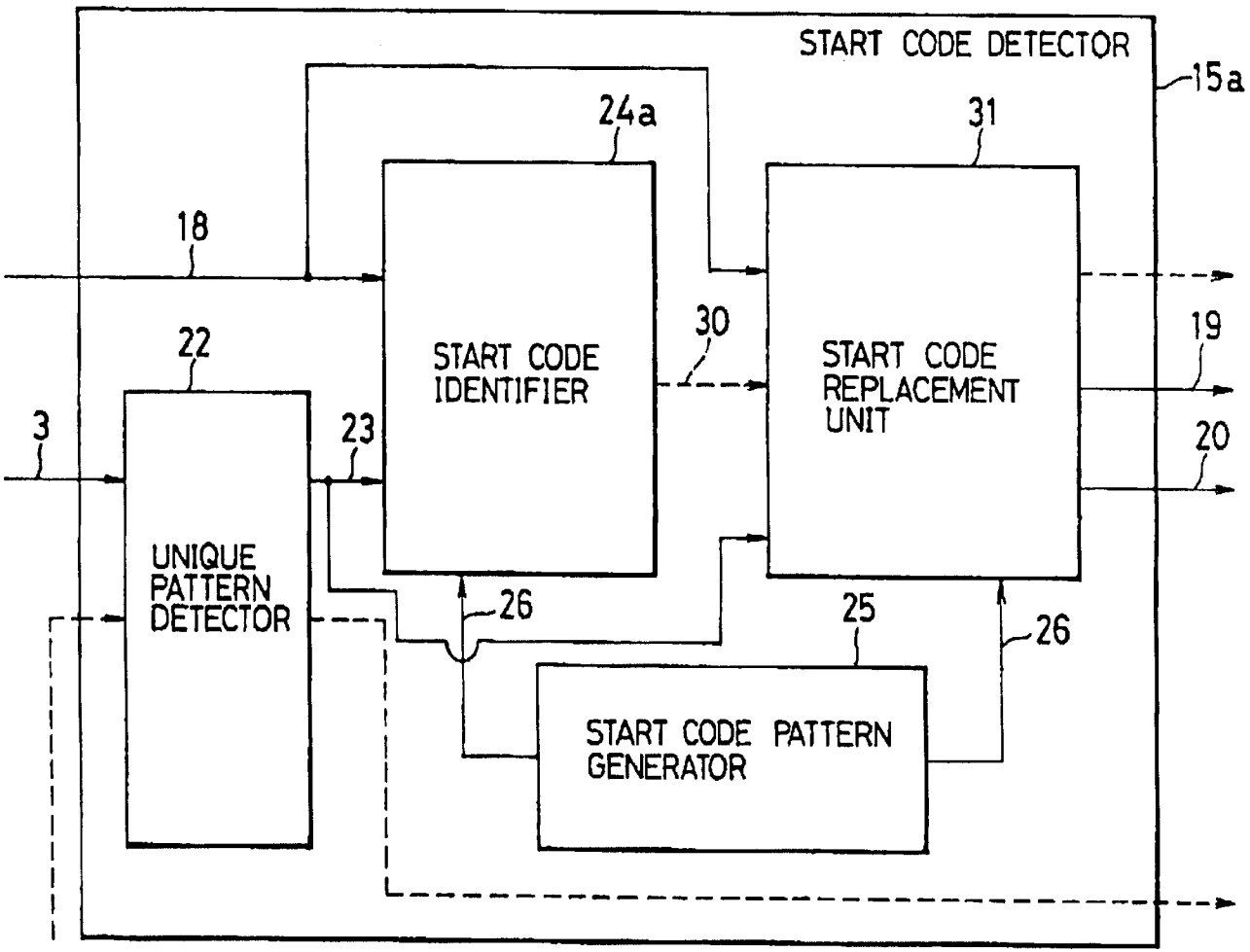
FIG. 15 shows a block diagram of a start code detector in a header analyzer of a decoder of the present invention according to another embodiment.
Figure 16:
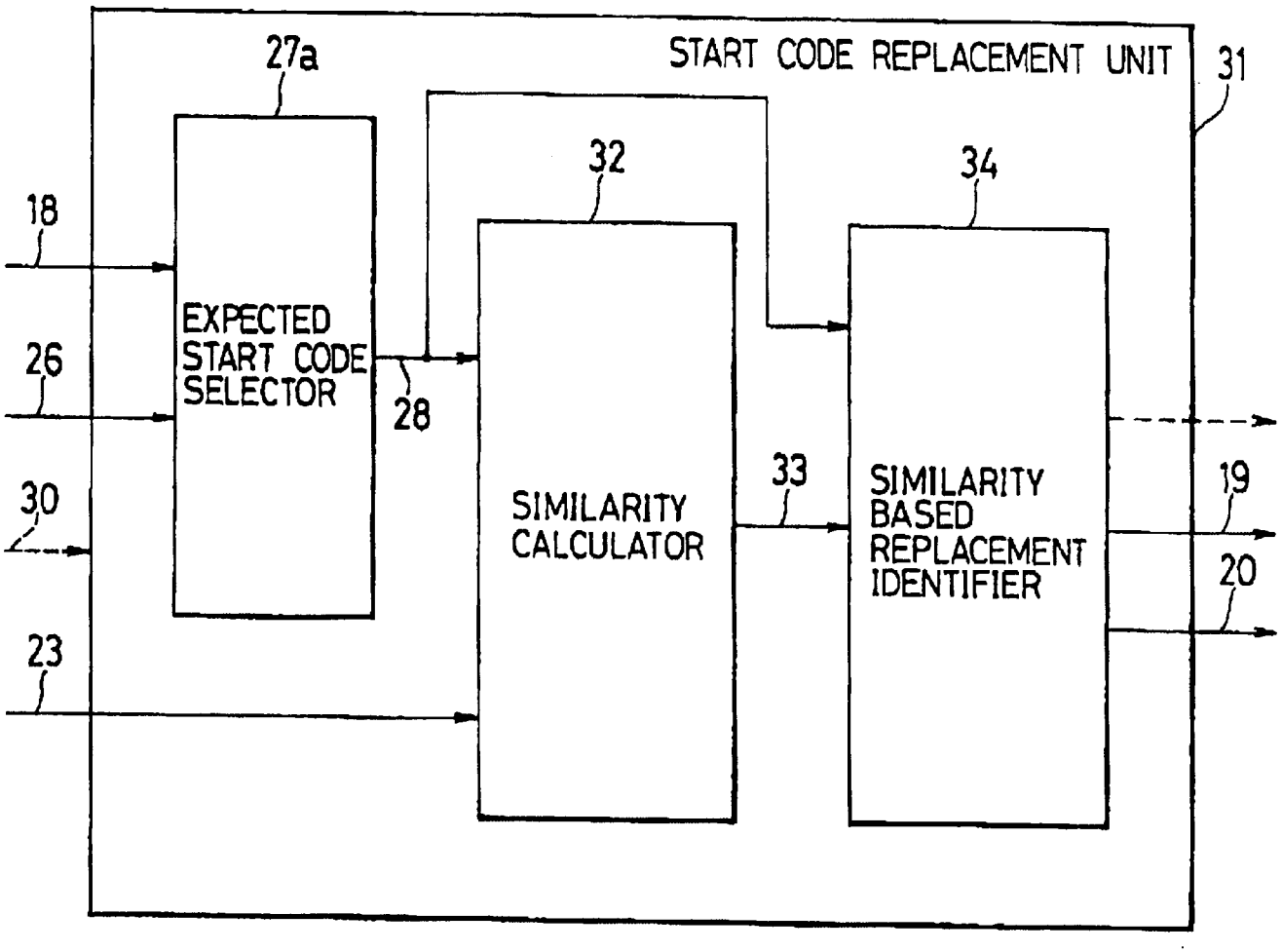
FIG. 16 shows a block diagram of a start code replacement unit in the start code detector of FIG. 15.

FIG. 15 is a block diagram of a start code detector 15a according to this embodiment. The embodiment of FIG. 15 is similar to the embodiment of FIG. 7, but with the addition of a start code replacement unit 31 and the replacement of the start code identifier 24 in FIG. 7 with a start code identifier 24a. FIG. 16 is a block diagram of the start code replacement unit 31 of FIG. 15. Referring to FIG. 16, the start code replacement unit 31 has an expected start code selector 27a, a similarity calculator 32 and a similarity based replacement identifier 34.

A start code replacement operation in the start code replacement unit 31 is now discussed with reference to FIGS. 15 and 16. When a detected start code is identified as none of the layer based expected start codes, the start code identifier 24a issues a replacement start signal 30 to the start code replacement unit 31. The expected start code selector 27a has the same function as that of the expected start code selector 27 in FIG. 9. The expected start code selector 27a selects a group of layer based expected start codes based on the latest layer information 18 and the table of layer based expected start codes in FIG. 10 in the same manner as that stated in the previous embodiment. The expected start code selector outputs the selected group of expected start codes as expected start codes 28 to the similarity calculator 32. The similarity calculator 32 calculates similarity between the bit pattern of the start code candidate 23 from the unique pattern detector 22 and a bit pattern of each of the expected start codes 28 from the expected start codes selector 27a. The similarity calculator 32 outputs a series of similarity values 33 for each expected start code to the similarity based replacement identifier 34. The similarity based replacement identifier 34 identifies the start code of all of the expected start codes 28 which is most similar to start code candidate 23 as a replacement start code based on similarity values 33 issued from the similarity calculator 32. Decoding will be maintained based on the replacement start code.

Figure 17:
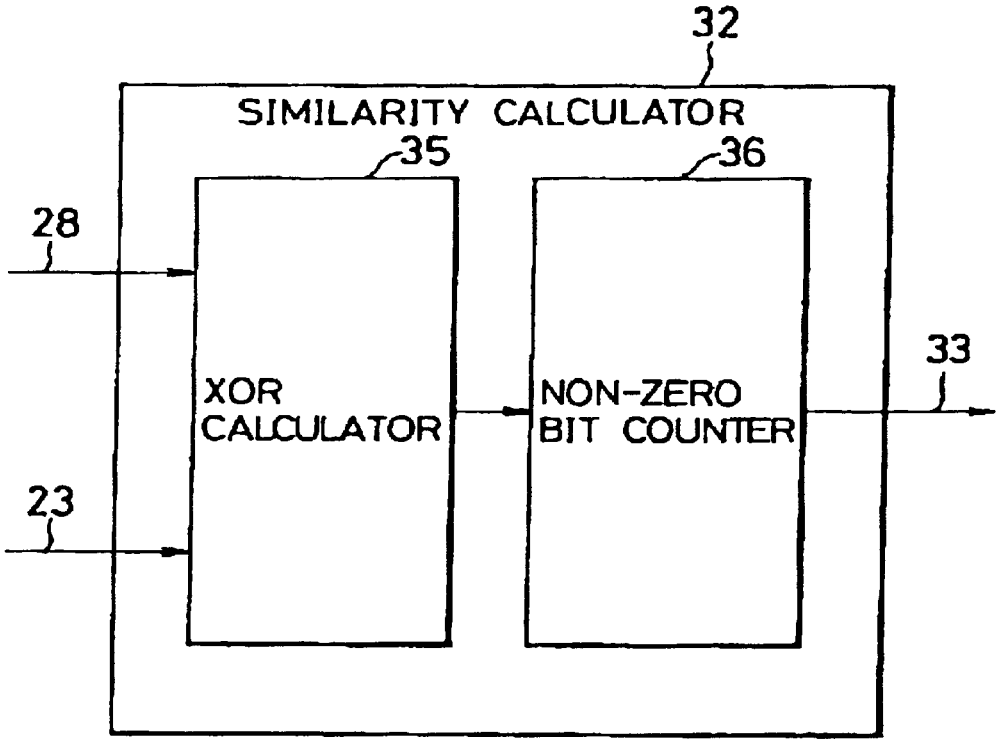
FIG. 17 shows a block diagram of a similarity calculator for calculating a code distance in the start code replacement unit of FIG. 16.

FIG. 17 shows the similarity calculator 32 in the start code replacement unit 31 in FIG. 16. The similarity calculator 32 evaluates similarity by calculating the Hamming distance or a code distance between two bit patterns of start codes. The Hamming distance is the number of bit positions that differ between two code words of the same length. For example, in "010010" and "110100", the Hamming distance is three. Similarity between two specific code words is assumed to be a function of the Hamming distance, i.e., two start codes are considered more similar the lower the Hamming distance between them. Referring to FIG. 17, each bit of the start code candidate 23 is EXCLUSIVE-ORed separately with each corresponding bit of each of the layer based expected start codes 28 in an EXCLUSIVE-OR operator 35. Each EXCLUSIVE-ORed result is sent to a non-zero bit counter 36 which counts the number of bit positions where the EXCLUSIVE-ORed result is 1.

The Hamming distance is calculated using only the last eight bits of the 32 bit start code candidate 23 and expected start codes 28. As an example, let us assume that the sequence_start_code "000001B3 in hexadecimal" is detected when the latest layer information indicates a picture layer. Layer based expected start codes corresponding to that condition are a slice_start_code "00000101 in hexadecimial", an extension_data_start_code "000001B5 in hexadecimal" and a user_data_start_code "000001B2 in hexadecimal" according to the table in FIG. 10. Then, the Hamming distances between the sequence_start_code and the expected start codes are respectively, 4 for the slice_start_code "00000101", 2 for the extension_data_start_code, and 1 for the user_data_start_code. Consequently the expected start codes 28, the user_data_start_code has the smallest Hamming distance and is considered the most similar start code to the sequence_start_code.

In this case, the similarity based replacement identifier 34 decides that the user_data_start_code is the most appropriate replacement start code for the start code candidate 23, i.e., the sequence_start_code. The similarity based replacement identifier 34 then issues the layer information 19 and the start code information 20 based on the replacement start code, the user_data_start_code in this case. Data of the latest layer information 18 stored in the layer memory 17 is then updated as required according to the layer information 19. The header information decoder 16 starts with the layer information 19 and the start code information 20.

Figure 18:
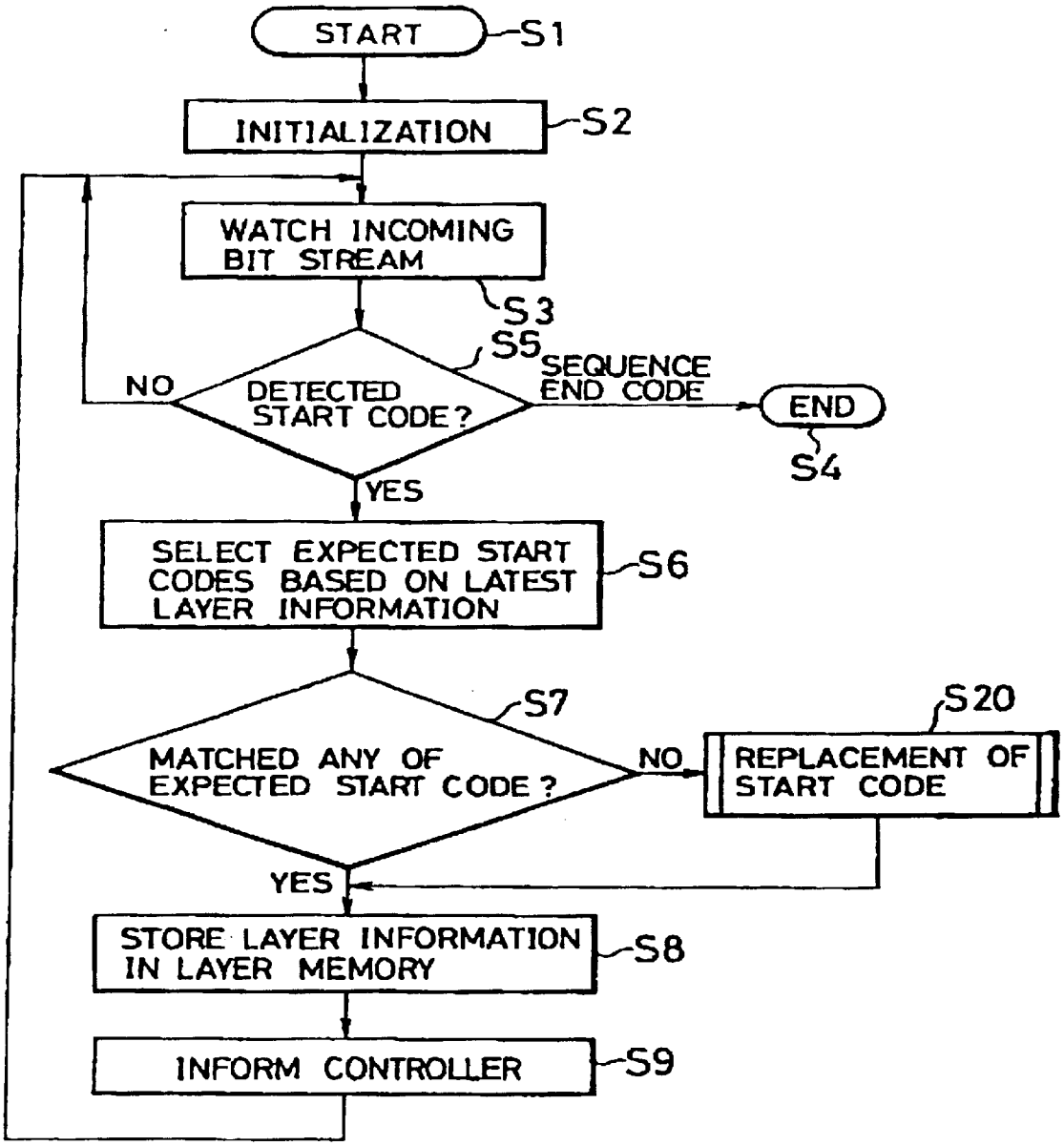
FIG. 18 is a flowchart illustrating a start code detecting and identifying operation in the a start code detector according to this embodiment.

FIG. 18 is a flowchart of a start code detecting process in the start code detector 15a according to this embodiment. The flowchart in FIG. 18 adds a start code replacement step S20 and omits the resynchronization step S10 of the flowchart in FIG. 13. In other words, the operating steps S1 through S9 in FIG. 18 corresponds to those in FIG. 13. This section, therefore, focuses only on a start code replacement operation including the start code replacement step 20 by avoiding the repetition of the same reference to the other steps as those in FIG. 13.

Referring to FIG. 18, when a detected start code pattern or the start code candidate 23 matches none of the layer based expected start codes in S7, the start code candidate 23 is replaced by the most appropriate start code for replacement of all the layer based expected start codes in S20. A replaced start code for the start code candidate is considered a start code in S8 and S9 hereinafter for further decoding operations in the decoder.

Figure 19:
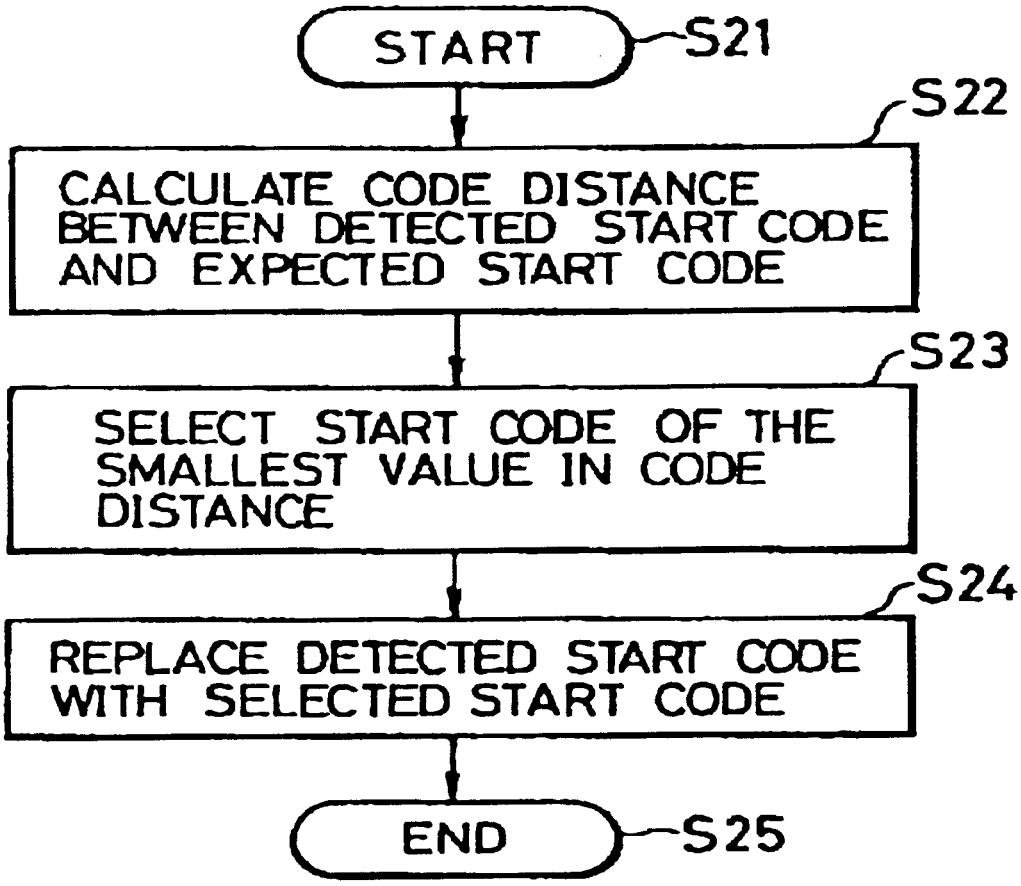
FIG. 19 is a flowchart illustrating a start code replacement operation in S20 in FIG. 18 according to this embodiment.

FIG. 19 is a flowchart illustrating a start code replacement process in S20 in FIG. 18 in more detail according to this embodiment. A series of replacement operations are summarized in the following operating steps:

S22 The Hamming distance is calculated between a detected start code pattern, i.e., the start code candidate and each layer based expected start code inside the start code detector.

S23 The expected start code with the smallest Hamming distance from the start code candidate is selected as an appropriate replacement start code.

S24 The start code candidate is replaced by the replacement start code selected in S23.

Embodiment 3

With further reference to the previous embodiment, a decoder of the present invention can implement an improved method of similarity evaluation in the similarity calculator 32. This embodiment is further based on a well-known fact that two bit patterns may have the same Hamming distance to a third pattern, yet one of the two patterns may be much more similar than the other to the third bit pattern. For example, 00000010 is more similar to 00000001 than 10000000, even though 00000010 and 10000000 have the same Hamming distance to 00000001. Similarity based evaluation in this embodiment further implements a weighting method using such a consideration. An EXCLUSIVE-ORed value in each bit position of a bit pattern between two codes is weighted for similarity calculation by the following formula:

$$w(8)*d(8)+w(7)*d(7)+\ldots+w(1)*d(1)$$

Referring to the formula, "w(8)*d(8)", for example, denotes that a weight coefficient in the eighth bit position of the bit pattern, "w(8)", is multiplied by an EXCLUSIVE-ORed value in the eighth bit position in the bit pattern, "d(8)". In this scheme w(8)>w(7)> . . . >w(1).

Embodiment 4

Figure 20:
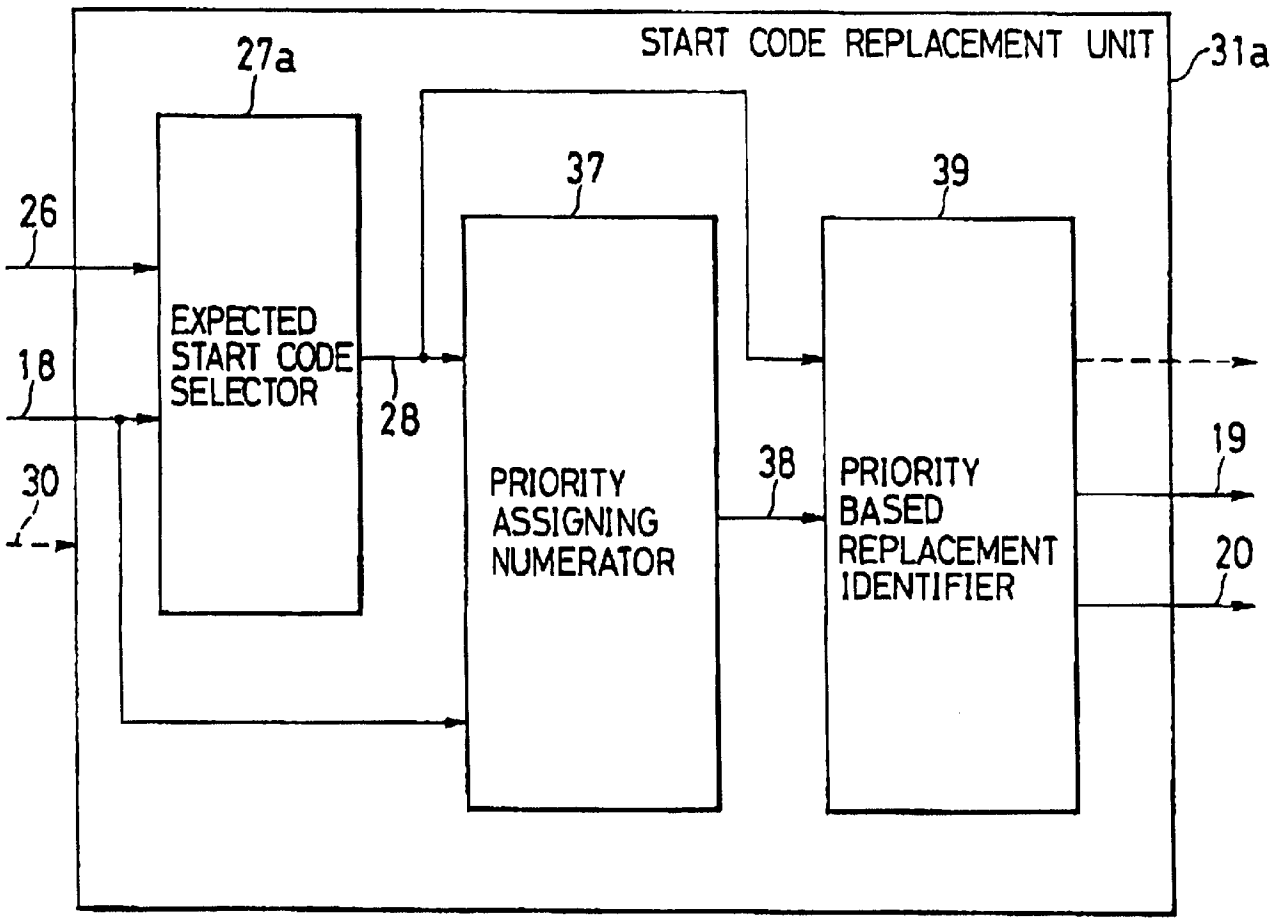
FIG. 20 shows a block diagram of a start code replacement unit in a start code detector in a decoder of the present invention according to another embodiment.

With further reference to FIG. 16, a decoder of the present invention can have a start code replacement unit which prioritizes layer based expected start codes. FIG. 20 is a block diagram of a start code replacement unit 31a. The embodiment of FIG. 20 is similar the embodiment of FIG. 16, except that the similarity calculator 32 and the similarity based replacement identifier 34 are replaced by a priority assigning numerator 37 and a priority based replacement identifier 39, respectively.

The start code replacement unit 31a according to this embodiment selects a replacement start code based on a priority based evaluation of layer based expected start codes. Layer based expected start codes in FIG. 10 are prioritized in order of their expectation of occurrence in the bit stream. Each of the layer based expected start codes is assigned a numerical value based on its probability of occurrence.

Figure 21:
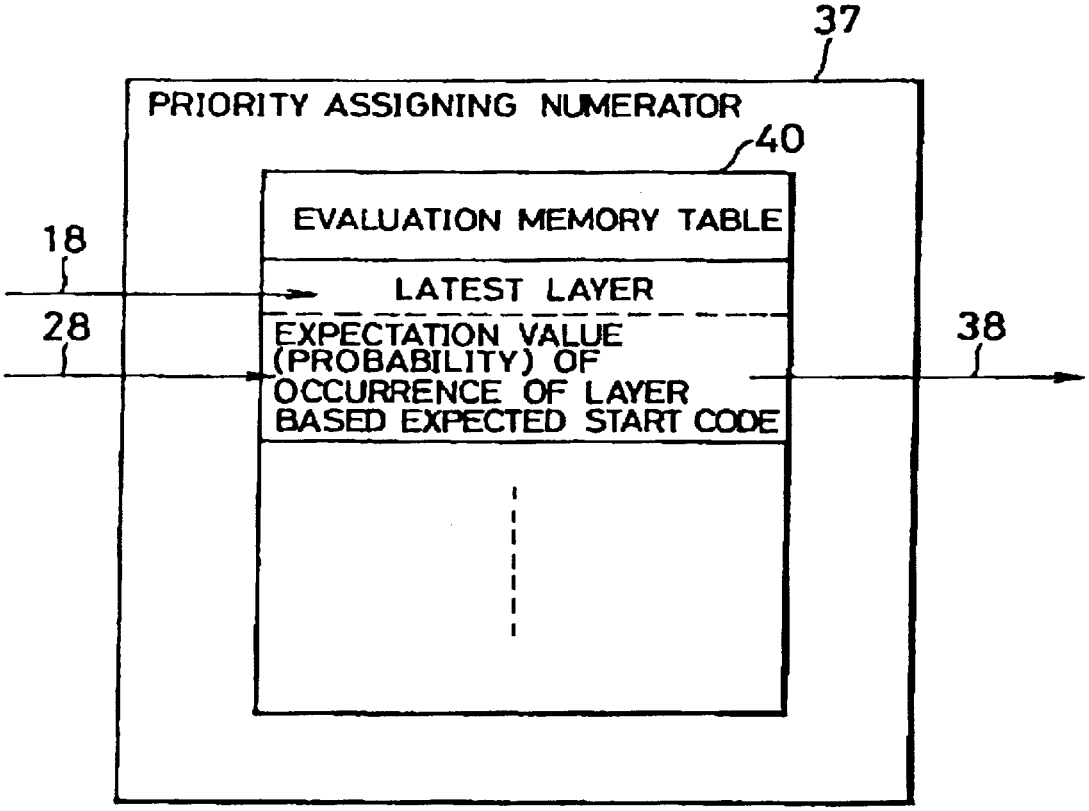
FIG. 21 shows a block diagram of a priority assigning numerator for evaluating probability of occurrence to layer based expected start codes by assigning priority orders in the start code replacement unit of FIG. 20.

FIG. 21 shows a block diagram of the priority assigning numerator 37 where the layer based expected start codes are prioritized with a priority based numerical value based on the expectation of occurrence. An evaluation memory table is provided in the priority assigning numerator 37. FIG. 22 is an example of the evaluation memory table 40.

According to the evaluation memory table in FIG. 22, for replacement evaluation, the layer based expected start codes are assigned numerical values based on the probability or expectation of occurrence. Each layer based group of expected start codes is assigned a fixed value for evaluation, 10 in this example. Thus, the sum of the expectation values of all expected start codes in each group is 10. The probability of occurrence for each layer based expected start code is calculated by dividing a value of the expectation of occurrence by the fixed value of 10.

For example, when the latest layer information is a sequence layer, the corresponding layer based expected start codes are the group_start_code "000001B8 in hexadecimal", the extension_data_start_code "000001B5 in hexadecimal" and the user_data_start_code "000001B2 in hexadecimal". Referring to the evaluation memory table in FIG. 22, the extension_data_start_code and the user_data_start_code are given a smaller value for the expectation of occurrence, 1 out of 10 each, because these start codes are usually optional in a bit stream of MPEG-1 video data. On the other hand, the group_start_code is given a larger value for the expectation of occurrence, 8 out of 10 because the group_start_code is usually a must in a bit stream of MPEG-1 video data.

Referring further to FIG. 22, when the latest layer information is a GOP layer or a picture layer, the extension_data_start_code and the user_data_start_code are each assigned a probability of occurrence value 2.

The extension_data_start_code or the user_data_start_code is usually optional as stated earlier depending greatly on the organizer's intention. A value for the expectation of occurrence is assigned depending on the bit stream type, e.g., MPEG-1. With a bit stream which contains no extension data or user data, a probability of occurrence value of 10 is assigned to the group_start_code when the latest layer is a sequence, as shown in the alternative memory table in FIG. 23. If the bit stream contains extension data but no user data, a value of 8 out of 10 may be assigned to the group_start_code for the expectation of occurrence and a value of 2 out of 10 to the extension_data_start_code as shown in the evaluation memory table in FIG. 24.

With further reference to the evaluation memory tables in FIGS. 21 through 24, values for the expectation of occurrence can be dynamically altered according to the incoming bit stream type. Values for the expectation of occurrence alternately can be dynamically updated by analyzing the previously processed data when the type of a bit stream is not known in advance. Furthermore the priority assigning numerator 37 can be provided with different types of evaluation memory table such as those in FIGS. 22 through 24 for different types of bit streams. Then the priority assigning numerator 37 assigns an optimal evaluation to the incoming data by selecting the most appropriate one of the evaluation memory table from among many choices. Otherwise, the priority assigning numerator 37 can assign an optimal evaluation by switching the evaluation memory table automatically or manually from one choice to another among many choices depending on data.

After assigning priority to each of the layer based expected start codes based on the value in the evaluation memory table, the priority assigning numerator 37 sends the prioritized expected start codes to a priority based replacement identifier 39. The priority based replacement identifier 39 selects an expected start code with the highest expectation value of occurrence from among others as a replacement for the start code candidate. A decoding operation will be proceeded hereinafter based on the replacement start code in the corresponding layer.

Embodiment 5

With further reference to the evaluation memory table 40 in the priority assigning numerator 37 in FIG. 21, the probability of occurrence can be assigned a priority number in descending or ascending order from the highest or lowest probability of occurrence rather than a value of the probability of occurrence. FIG. 25 shows another example of the evaluation memory table 40. According to this embodiment, each of the layer based expected start codes is given a priority number in descending order from the highest expectation of occurrence. According to the table in FIG. 25, the group_start_code is the first in the priority order, the extension_data_start_code is the second in the priority order and the user_data_start_code is the third in the priority order when the latest layer is a sequence.

Embodiment 6

Figure 26:
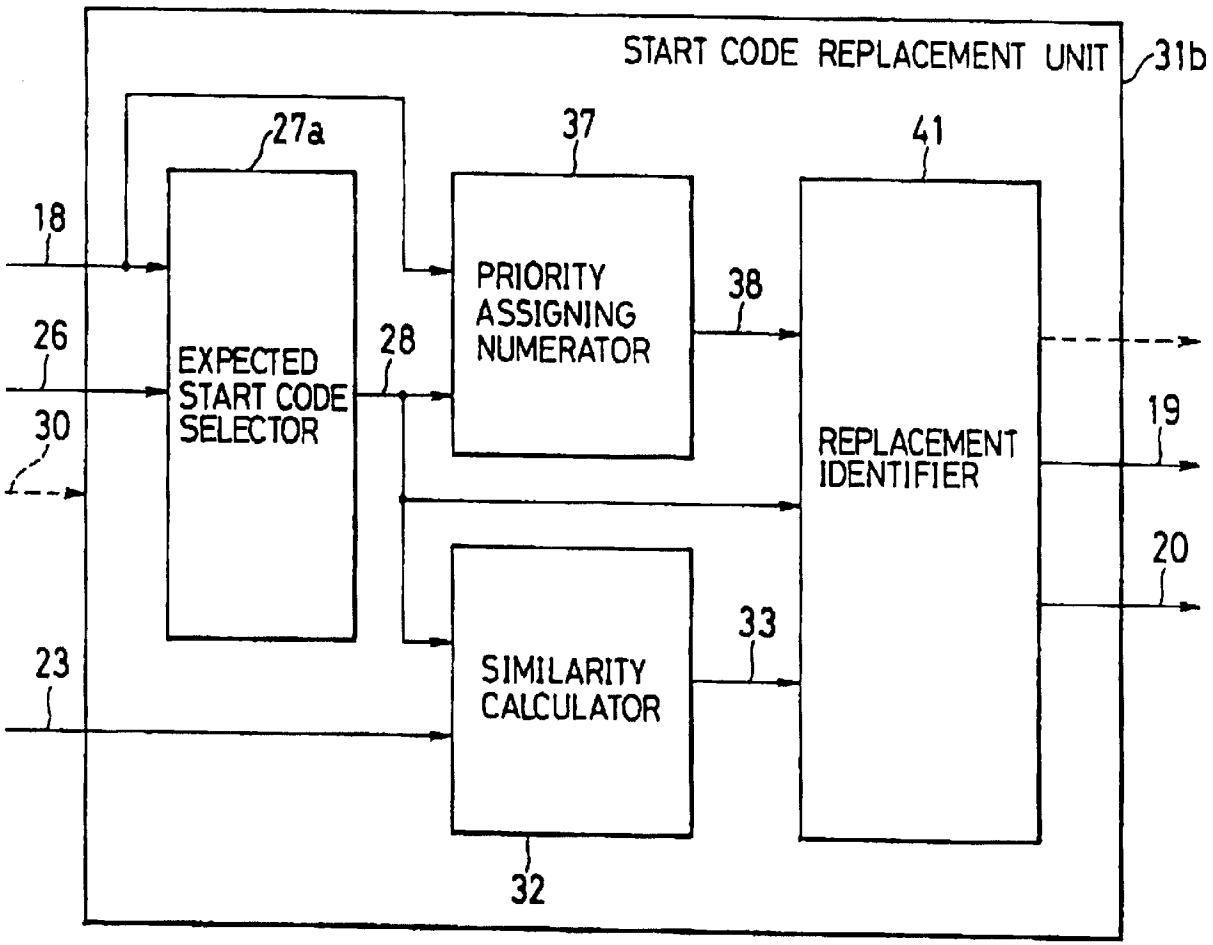
FIG. 26 shows a block diagram of a start code replacement unit in a start code detector in a decoder of the present invention according to another embodiment.

With further reference to the start code replacement unit 31, a decoder of the present invention can be provided with a start code replacement unit which employs the similarity calculator 32 of the second embodiment and the priority assigning numerator 37 of the fourth embodiment. FIG. 26 shows a block diagram of a start code replacement unit 31b according to this embodiment. Referring to the figure, the start code replacement unit 31b has the similarity calculator 32 which is the same unit as that in FIG. 16, the priority assigning numerator 37, which is the same unit as that in FIG. 20, and a replacement identifier 41.

In the start code replacement unit 31b, the similarity calculator 32 calculates a code distance between the start code candidate 23 detected in the unique pattern detector 22 and each of the expected start codes 28. Meanwhile, the priority assigning numerator 37 prioritizes the expected start codes 28 with numerical values for the expectation or probability of occurrence. The replacement identifier 41 identifies the most appropriate start code to be detected among the similarity value 33 from the similarity calculator 32 and a prioritized value 38 from the priority assigning numerator 37 in accordance with a predetermined criterion.

The following is an exemplary evaluation formula for replacement:

$$W=D[Pi(L)]-E[Pi(L)]$$

Referring to the formula, Pi(L) is one of the expected start codes 28 Pi based on a layer L of the latest layer information. D[Pi(L)] is a code distance D between the start code candidate 23 and one of the layer based expected start codes Pi(L). E[Pi(L)] is a value of the expectation of occurrence of one of the layer based expected start code Pi(L). According to the formula, the start code with the best combination of a low code distance and a high expectation of occurrence will be selected as the replacement start code in the replacement identifier 41. A decoding operation will then be carried out based on the replacement start code in the corresponding layer.

Embodiment 7

With further reference to the sixth embodiment, the evaluation for replacement of the present invention can also be based on weighted values of similarity as set forth in the third embodiment or prioritized data with a priority number assigned to the probability of occurrence in the fifth embodiment.

Embodiment 8

Figure 27:
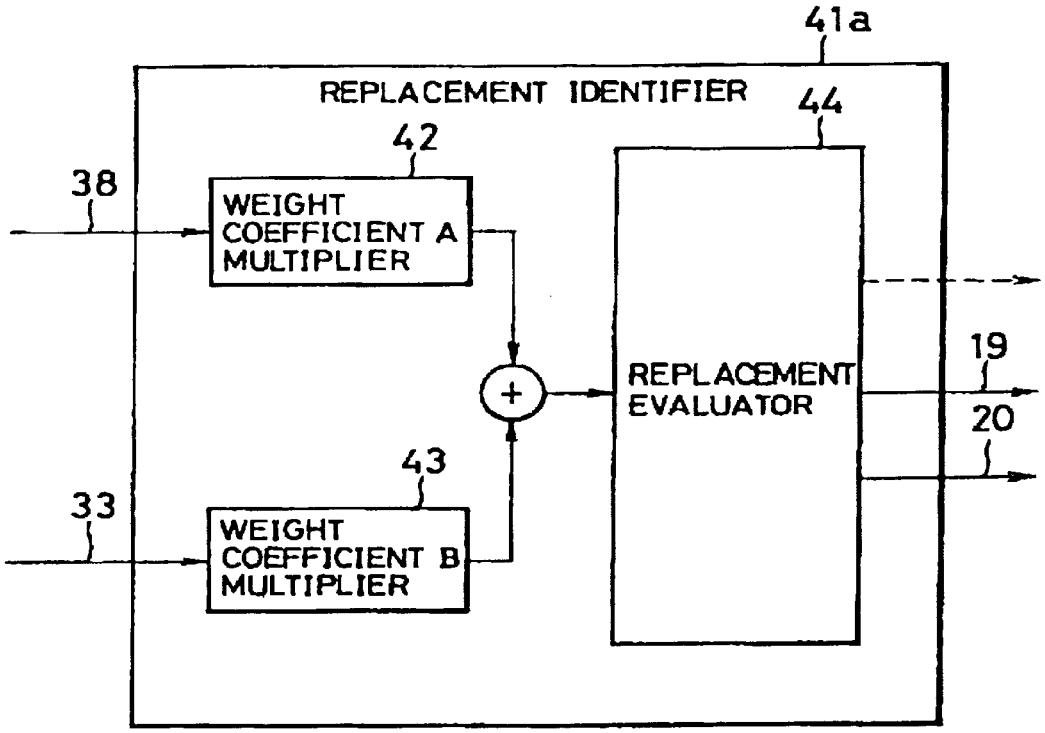
FIG. 27 shows a block diagram of a replacement identifier in a start code replacement unit in a decoder of the present invention according to another embodiment.

Replacement evaluation of the present invention can be based on another formula. FIG. 27 shows a block diagram of a replacement identifier 41a which has a weight coefficient A multiplier 42, a weight coefficient B multiplier 43 and a replacement evaluator 44.

In this embodiment, the similarity value 33 and the prioritized value 38 output from the similarity calculator 32 and the priority assigning numerator 37, respectively, in the sixth embodiment are weighted in the replacement identifier 41a. The similarity value 33 and the prioritized value 38 are weighted by multiplying a certain coefficient respectively in a weight coefficient B multiplier 43 and a weight coefficient A multiplier 42. A weight based value W' is calculated by the following formula:

$$W'=A*D[Pi(L)]+B*E[Pi(L)]$$

This weight based calculation produces a choice of evaluation between similarity oriented evaluation and priority oriented evaluation.

An exemplary weight based evaluation method is described below. Slice layers tend to occur consecutively in an MPEG-1 video data bit stream due to its layered data structure. Therefore, it is relatively likely to detect a plurality of slice_start_codes consecutively. In other words, the slice_start_codes have the highest probability of occurrence value of all the start codes. For this reason, it is desirable to give more weight to the probability of occurrence, E, than the similarity of codes, D, in order to select a slice_start_code as a replacement with $B \leqq A$.

A decoding operation would then be carried out based on the replacement in the corresponding layer.

Embodiment 9

Figure 28:
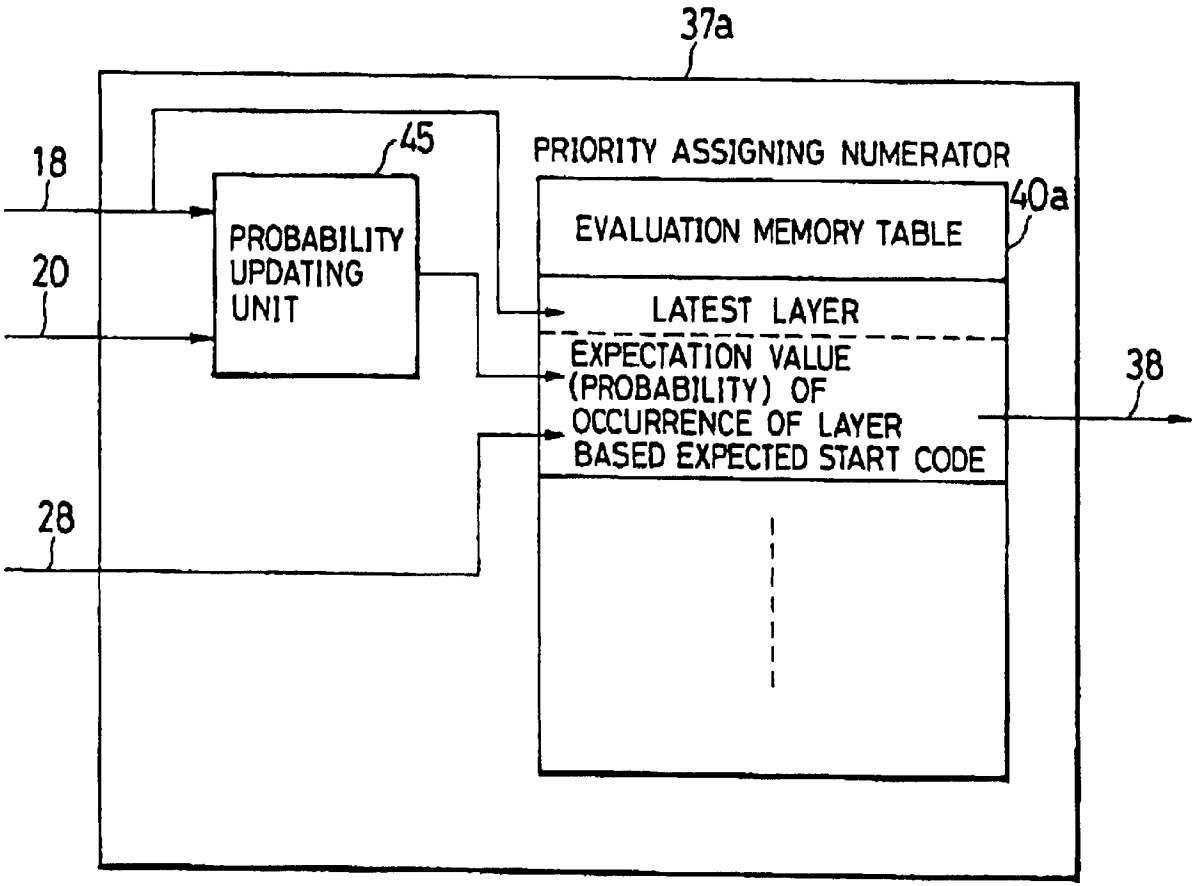
FIG. 28 shows a block diagram of a priority assigning numerator for evaluating probability of occurrence of layer based expected start codes in a start code replacement unit in a decoder of the present invention according to another embodiment.

With further reference to the start code replacement unit in the fourth an sixth embodiments, a priority assigning numerator of the present invention can be controlled so as to update the probability of occurrence table for layer based expected start codes in a probability based evaluation. FIG. 28 shows a block diagram of a priority assigning numerator 37a according to this embodiment. The priority assigning numerator 37a has a probability updating unit 45 and an evaluation memory table 40a.

The probability updating unit 45 updates values of the probability of occurrence to be assigned to a group of layer based expected start codes in the priority assigning numerator 37a based on the latest layer information 18 and the start code information 20 in advance. Updated values of the probability of occurrence for the group of layer based expected start codes in the probability updating unit 45 are input in the evaluation memory table 40a to update the previously assigned values. Each of the group layer based expected stat codes is assigned the updated evaluation memory table.

The updating method of the probability of occurrence according to this embodiment works as described below. A slice is a part of a picture. The last eight bits of a bit pattern of a slice start code indicate the location on the video screen. In this respect, neighboring slices tend to appear consecutively as stated earlier. It is highly likely therefore that a slice_start_code is followed by another slice_start_code. For this reason, it is desirable to assign a higher probability of occurrence to a slice_start_code in a group of layer based expected start codes when the previously detected start code is a slice_start_code. Thus, according to this embodiment, this method can update probability of occurrence values optimally based on detected start code patterns, which can accomplish a highly reliable start code replacement operation in the decoder.

Embodiment 10

Figure 29:
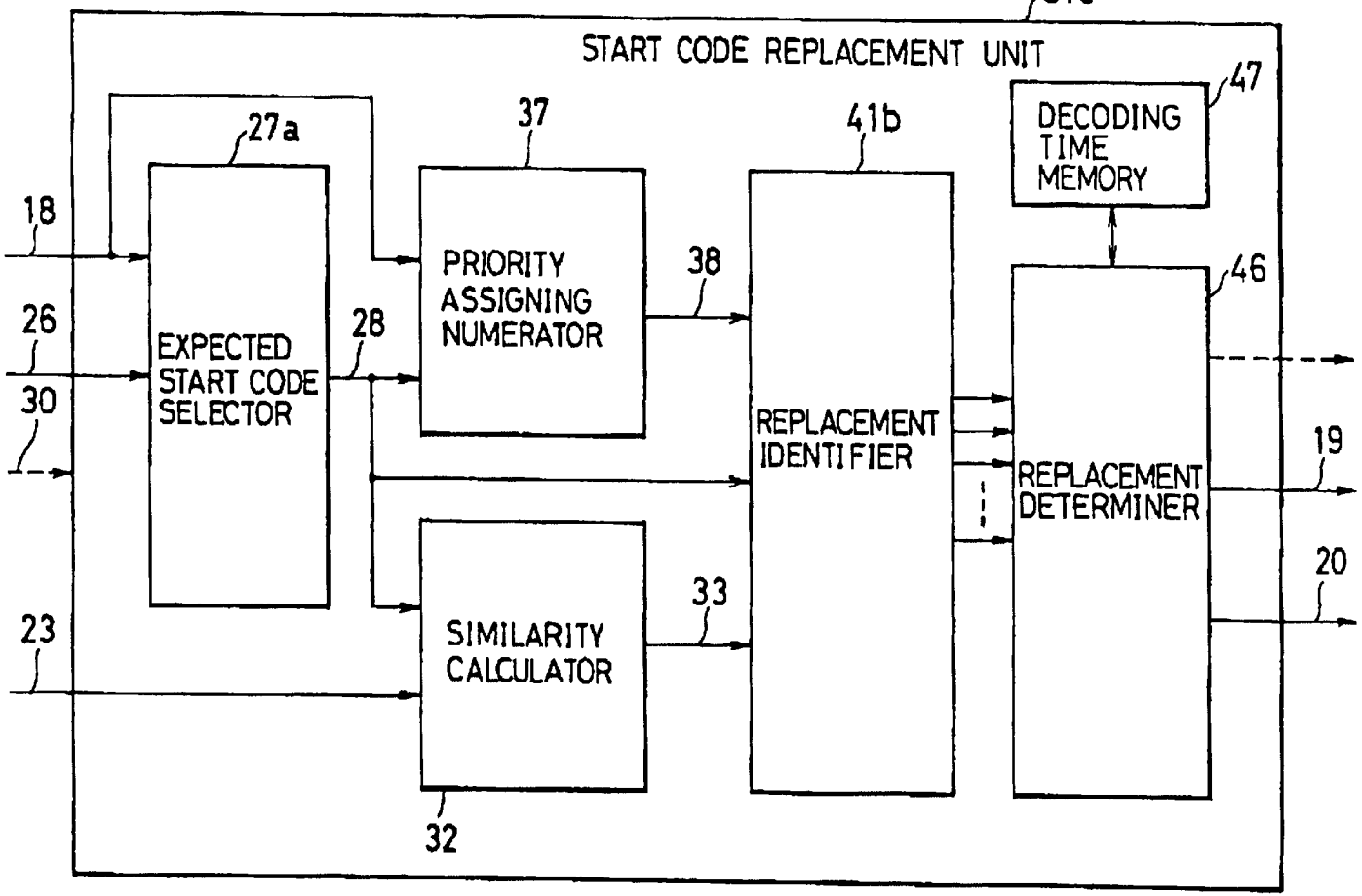
FIG. 29 shows a block diagram of a start code replacement unit in a start code detector in a decoder of the present invention according to another embodiment.

With further reference to the start code replacement unit 31b in FIG. 26, a start code replacement operation with a sophisticated method of defining the most appropriate replacement start code is provided by locally decoding data in accordance with two or more possible replacement start codes before identifying a replacement start code in order to improve replacement reliability. FIG. 29 shows a start code replacement unit 31c according to this embodiment. The start code replacement unit 31c has a replacement determiner 46 and a decoding time memory 47. The decoding time memory 47 stores layer based decoding time values for an error check.

The start code replacement operations discussed hereinbefore seem to bear common drawbacks in the following respects: A start code replacement unit replaces an erroneous start code with the most appropriate start code of all the layer based expected start codes. This operation, however, still does not guarantee that the replacement start code is correct. Furthermore, a replacement operation may result in two or more expected start codes being assigned the same replacement value. According to this embodiment, the start code replacement unit is designed to improve reliability of a start code replacement operation in view of those problems. In this embodiment, the corresponding received date is locally decoded in the start code replacement unit based on two or more start codes of a group of layer based expected start codes which are found to be equally appropriate candidates. A replacement start code is identified based on the decoded result of the replacement candidates for a predetermined time period. Decoding will be maintained based on the replacement start code.

Referring to FIG. 29, the replacement identifier 41b identifies two or more replacement candidates and outputs them to the replacement determiner 46. The replacement determiner 46, a local decoder, decodes the replacement candidates for a predetermined period of time.

The replacement determiner 46 can be provided with the same function as those of the header information decoder 16 and the data-block decoder 7. Otherwise, the replacement determiner 46 can make the header information decoder 16 and the data-block decoder 7 locally decode the replacement candidates. Data following the replacement candidates are locally decoded for a required period of time. The time period can be a function of the layer of a replacement candidate or the latest layer information corresponding to a replacement candidate.

FIG. 30 shows a table of decoding time stored in the decoding time memory 47. The table of decoding time lists layer based prescribed local decoding time enough for detecting error. When a large amount of error is detected in a replacement candidate in a given period of decoding time as set forth in the table, it is likely that the replacement candidate is not the proper replacement start code. In other words, the replacement determiner 46 identifies as the proper replacement start code the start code which results in the least error detected in the local decoding.

Thus, the decoder according to this embodiment can achieve effective and reliable decoding with an utmost appropriate replacement start code selected from among two or more replacement candidates.

Embodiment 11

With further reference to the tenth embodiment of the present invention, the replacement identifier 41b in the start code replacement unit 31c in FIG. 29 can be replaced with the similarity based replacement identifier 34 in the start code replacement unit 31 in FIG. 16 discussed in the second embodiment.

Embodiment 12

With still further reference to the tenth embodiment of the present invention, the replacement identifier 41b in the start code replacement unit 31c in FIG. 29 can be replaced with the priority based replacement identifier 39 in the start code replacement unit 31a in FIG. 20 discussed in the fourth embodiment.

Embodiment 13

With further reference to the inventive arts of start code replacement discussed in the second through ninth embodiments, a decoder of the present invention can include a controller for controlling implementation of a start code replacement.

According to this embodiment a start code replacement operation is commenced only under the following conditions:

1. The start code candidate is detected after data corresponding to the previously detected start code is decoded in the header information decoder or the block-data decoder; and,
2. The number of minor errors (or bit errors), which should give no influence to continuing decoding, detected in the inventive decoder before the error detection of a start code pattern is less than a given number.

These conditions assumes that the decoder had been conducting a normal decoding operation before a start code pattern is detected by error. This further assumes that the start code candidate is one of the layer based expected start codes. Consequently, the start code candidate detected in a situation lacking these conditions is highly likely to be no start code. In other words, it is an error code to be discarded and if replacement is implemented based on the error code, decoding will be damaged.

Figure 31:
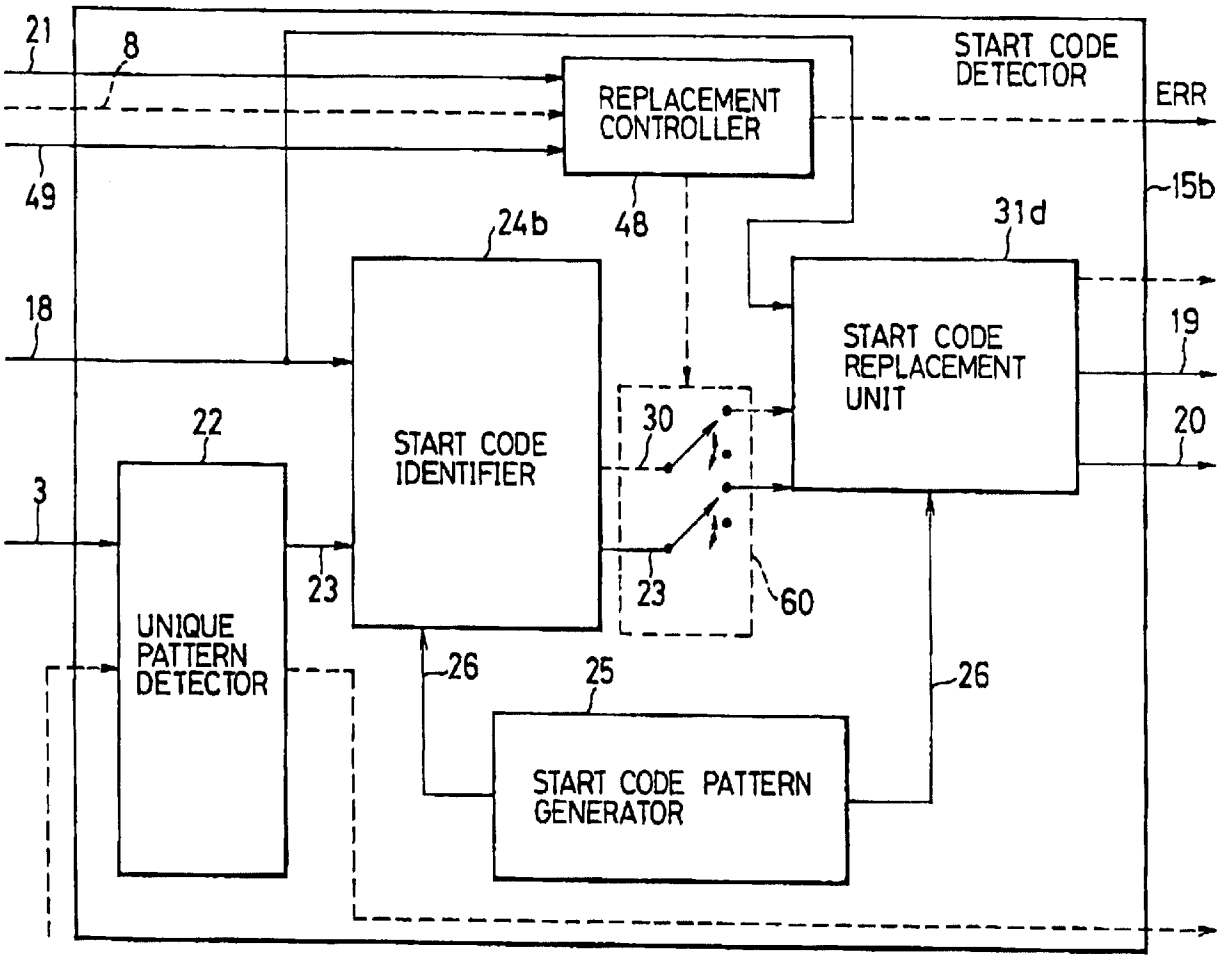
FIG. 31 shows a block diagram of a start code detector in a decoder of the present invention according to another embodiment.

FIG. 31 shows a block diagram of a start code detector 15b according to this embodiment. Referring to the figure, the start code detector 15b includes a replacement controller 48 and switches 60 for a replacement control. The replacement controller 48 controls the implementation of replacement based on error information 49 with a data decoding end signal 8 or the header decoding end signal 21.

The header decoding end signal 21 is output from the header information decoder 16 and indicates that the decoding of data corresponding to the previously detected start code at, for example C2, C3, C4 or C5 in FIG. 3 has ended. The data decoding end signal 8 is output from the block-data decoder 7 and indicates that the decoding of data corresponding to the previously detected start code at, for example, C6, C7, C8, C11, C12 or C13 in FIG. 3 has ended. The error information 49 is output from the controller 10 informing of the number of minor or bit errors detected while decoding in the block-data decoder 7 or the header information decoder 16 as determined by the controller 10.

When the header information decoder 16 of the block-data decoder 7 is desynchronized, however, the header decoding end signal 21 or the data decoding end signal 8 is considered damaged and cannot be trusted to detect a start code. The error information 49 indicates whether those decoders are in synchronism. The number of minor errors counted in the controller 10 of the error information 49 indicates to some extent the decoding condition of those decoders. The replacement controller 48, therefore, refers to the error information 49 when receiving the block-data decoding end signal 8 or the header decoding end signal 21 from the block-data decoder 7 or the header information decoder 16. When the number on the error information 49 is less than a given number, the replacement controller 48 allows the start code replacement unit 31d to implement a start code replacement. Otherwise, the start code candidate is discarded without a replacement.

Figure 32:
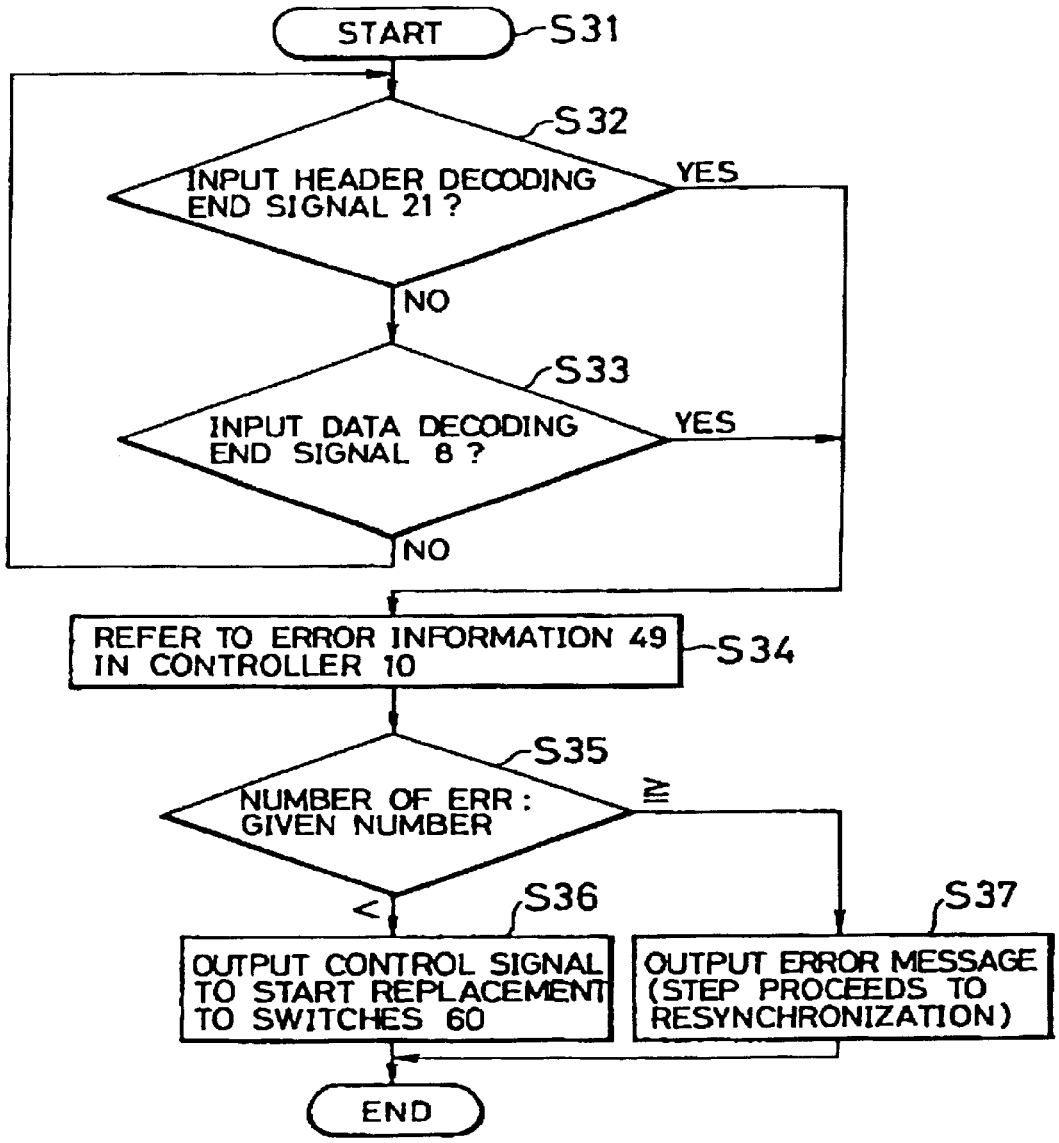
FIG. 32 is a flowchart illustrating a replacement control in a replacement controller in the start code detector in FIG. 31 according to this embodiment.

FIG. 32 is a flowchart of a replacement control operation in the replacement controller 48. A replacement control method in the start code detector 15b is now described by the following operating steps:

S31 A replacement control operation starts when the start code detector 15b starts.

S32 The replacement controller 48 waits until the header decoding end signal 21 is input.

S33 Otherwise, the replacement controller 48 waits until the data decoding end signal 8 is input.

S34 When the decoding signal is input in S32 or S33, the replacement controller 48 refers to the error information 49 input from the controller 10.

S35 The replacement controller 48 compares the number of minor error on the error information 49 with a preset number for comparison.

S36 When the number on the error information 49 is less than the preset number in S35, the replacement controller 48 sends a control signal to the switches 60 to allow the start code replacement unit 31d to implement a replacement. Consequently, the replacement start signal 30 and the start code candidate 23 are sent to the start code replacement unit 31d from the start code identifier 24b via the switches 60.

S37 When the number on the error information 49 exceeds the preset number in S35, the replacement controller 48 issues a control signal to the switcher 60 and an error signal to the controller 10. Consequently, the controller 10 recognizes that the start code candidate is an error detected by error and starts a resynchronizing operation in the same manner stated earlier.

The replacement control method implemented in the start code detector 15b enables the inventive decoder to accomplish an effective decoding by reducing the possibility of an erroneous start code replacement. This can contribute to highly reliable decoding with replacement.

Embodiment 14

With further reference to the previous embodiments dealing with a bit stream of MPEG-1 video data, a decoder of the present invention can decode a bit stream of MPEG-2 video data with the same method implemented with MPEG-1 video data stated earlier in the previous embodiments. MPEG-2 video data is very similar to MPEG-1 video data in its bit stream syntax because the types of start codes and the layered structure of a bit stream adopted in MPEG-2 video data are almost the same as those of MPEG-1. In this respect, the inventive methods of a start code identification and replacement based on the layered bit stream organization with MPEG-1 video data can be applied to MPEG-2 video data. (The MPEG-2 video data will be standardized by the prescription of ISO/IEC 13818-2 and ITU-T H.262.)

FIG. 33 shows a table of layer based expected start codes of MPEG-2 video data which corresponds to that in FIG. 10 of MPEG-1 video data. As a characteristic feature of MPEG-2 video data, the sequence_start_code and the picture_start_code are always followed by the extension_data_start_code. In other layers, extension data are optional. The extension_data_start_code, therefore, should have a top priority in the expectation of occurrence in a sequence layer and a picture layer in MPEG-2 video data. In a replacement evaluation in MPEG-2 video data, this characteristic organization of start code in the bit stream should therefore be considered.

The table of layer based expected start codes in FIG. 33 is applicable to both MPEG-1 and MPEG-2 video data. MPEG-2 is an extended specification of MPEG-1 and consequently a decoder for MPEG-2 video data should be designed to decode both MPEG-1 and MPEG-2 video data. As briefly mentioned earlier, the characteristic difference between MPEG-1 and MPEG-2 video data concerns extension data. The extension_data_start_code in a bit stream of MPEG-2 video data, but not in a bit stream of MPEG-1 video data. In this respect, the type of video data, MPEG-1 of MPEG-2, can be distinguished by bit stream organization with or without the extension_data_start_code following the sequence_start_code or the picture_start_code. The decoder for dealing with the both video data can identifier the type of video data by the existence or absence of the extension_data_start_code after the sequence_start_code in a bit stream. When the sequence_start_code or the picture_start_code is not followed by the extension_data_start_code in a video data as MPEG-1. This invention decoder uses an algorithm common to both MPEG-1 and MPEG-2 video data for decoding data in a bit stream until the type of video data is identified. Once the type of video data is identified, the decoder switches to another algorithm optimal to the identified video data for further decoding of a bit stream.

Thus, the decoder according to this embodiment is applicable to a bit stream intermingled with both of MPEG-1 and MPEG-2 data, as well as an exclusive bit stream of MPEG-1 video and data or MPEG-2 video data.

Embodiment 15

With further reference to the previous embodiments dealing with a start code in MPEG-1 and/or MPEG-2 video data as a synchronization signal, a decoder of the present invention can detect a system start code as well as a start code in MPEG-1 and/or MPEG-2 system data as a synchronization signal. The MPEG-1 and MPEG-2 system data have a multiplexed data structure including different media information of audio, video, data, etc. The inventive method of this embodiment provides a decoder to synchronize decoding between MPEG-1 and/or MPEG-2 video data and MPEG-1 and/or MPEG-2 audio data for effective start code identification and replacement.

Figure 34:
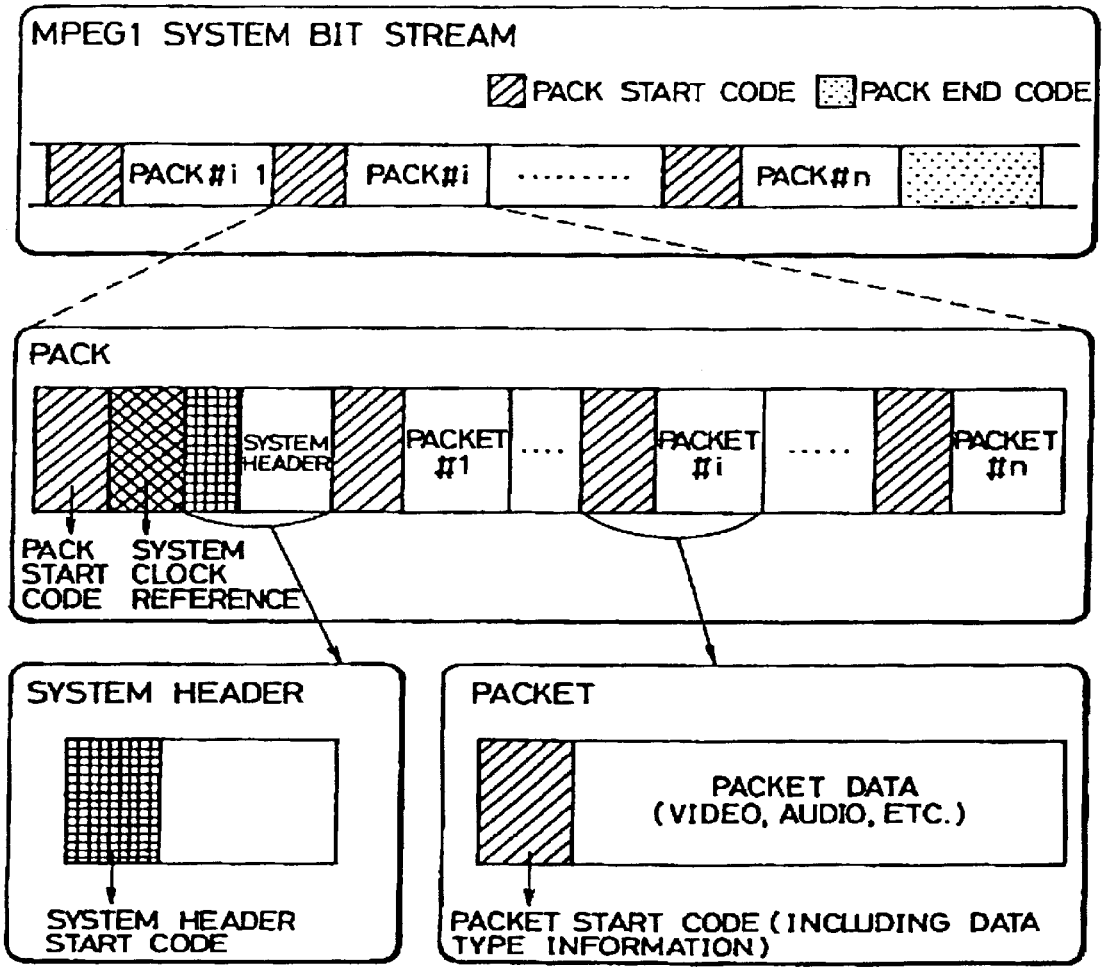
FIG. 34 shows a bit stream organization of MPEG-1 system data to be decoded in a decoder of the present invention according to another embodiment.

FIG. 34 shows a bit stream of MPEG-1 system data (ISO/IEC 11172-1) and its detailed diagrams. Referring to the figure, a pack layer is the upper level in a hierarchical structure of the data. A pack layer is followed by a system layer with sublayers of a packet layer in the bit stream. FIG. 35 shows a table of layer based expected start codes of MPEG-1 system data. The art of start code identification or replacement discussed in the previous embodiments is applicable to MPEG-1 system data in view of the above stated characteristic organization of a bit stream.

Embodiment 16

Figure 36A:
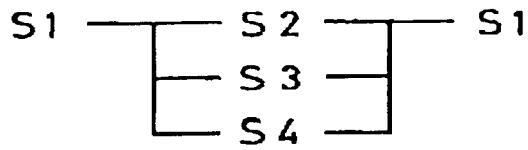
FIG. 36-a,b,c shows different possible types of a regularly organized layered structure in a bit stream according to another embodiment of the present invention.
Figure 36B:
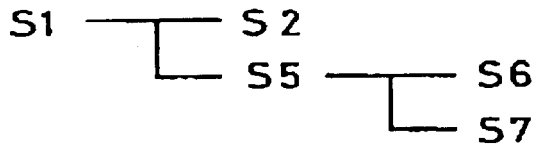
Figure 36C:
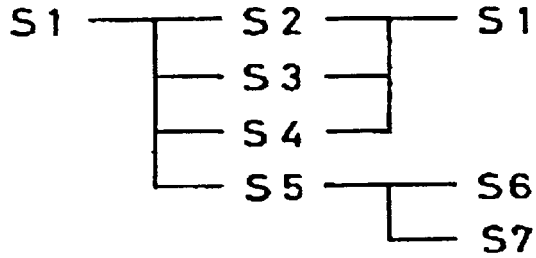
Figures 37, 38:
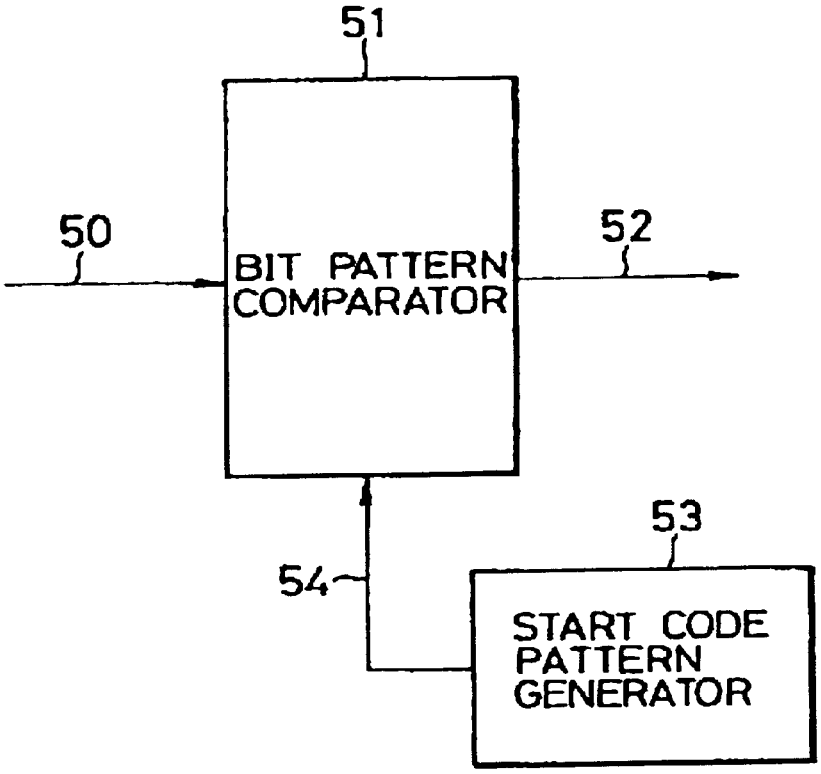
FIG. 37 CONVENTIONAL ART
FIG. 38 CONVENTIONAL ART
FIG. 37 shows a block diagram of a start code detector of a conventional decoder for detecting only a single type of start code of fixed-bit length.
FIG. 38 shows a list of start code patterns within a detection tolerable capacity of one-bit error according to a conventional start code detection method.

With further reference to the previous embodiments dealing with a layered bit stream organized in a regular order from an upper level layer to a lower level layer, a decoder of the present invention can deal with a layered bit stream organized in various ways if organized in a regular order. FIG. 36 shows different types of layered structure in a bit stream.

Referred to FIG. 36, a diagram (a) illustrates a layered structure of a data sequence in a bit stream where an upper level layer is followed by the lower layers and ends the data sequence with the upper level layer again. A diagram (b) illustrates another layered structure of a data sequence in a bit stream where an upper level layer is followed by the lower layers, one of which is followed by its lower level layers which ends the data sequence. A diagram (c) illustrates a intermingled layered structure of a data sequence in a bit stream which combines the two different types of layered structure of (a) and (b).

According to this embodiment, the art of start code identification or replacement discussed in the previous embodiments can be applied to a data stream based on any type of layered structure shown in FIG. 36.

Embodiment 17

With further reference to the inventive arts implemented in a decoder for decoding data discussed in the previous embodiments, the arts can also be applied to a data receiver where data are received and used with no process of decoding.

A data receiver with the inventive arts can predict the type of incoming data based on the type of the processing data by using the nature of the inventive data stream organization by which data are input with a certain regularity. This can reduce a misuse of an error start code.

In a data receiving method relating to the present invention, an expected start code is selected based on the type of the processing data and the previously detected start code, and a newly detected start code is compared with the selected expected start code. When the detected start code doe not accord with the expected start code, the data receiver resynchronizes itself to the incoming data. This can recover a normal data receiving performance in an early stage and restore the receiving error automatically.

In a data receiving method relating to the invention, a detected start code pattern is replaced with an expected start code when they do not match, and a data receiving operation is continued based on the replacement start code. This can prevent the misuse of a detected error start code.

What is claimed is:

1. An apparatus for receiving and decoding a bit stream of data blocks, each comprising a digital coded bit sequence, which are organized in a hierarchy including a plurality of layers, each layer having associated therewith one of a plurality of layer types, wherein at least one layer of a high-order layer type is composed of at least one layer of a lower-order layer type, each of the data blocks corresponding to one of the layers and including a start code which identifies the layer type of the data block, the apparatus comprising:

a layer memory for storing data indicating the layer type corresponding to the last start code received in the bit stream, the layer memory having a last layer type output, a first expected start code selector coupled to receive the last layer type output from the layer memory, the first expected start code selector selecting and generating a first expected start code selector output identifying a set of expected start codes based on the last layer type received, wherein start codes of data blocks in the high-order layers are identified as expected start codes before start codes of data blocks in the lower-order layers;

start code detector, coupled to received the bit stream and the first expected start code selector output, for detecting start codes by comparing data in the bit stream with the set of expected start codes, the start code detector selecting one of the expected start codes as a detected start code, if one of the expected start codes is similar to data in the bit stream, the start code detector having a start code detector output which identifies the detected start code and its corresponding layer type;

means responsive to the start code detector output for updating the layer memory with data indicating the layer type corresponding to the detected start code; and a block data decoder, responsive to the detected start code output from the start code detector, for decoding the data block corresponding to the detected start code.

2. An apparatus as set for in claim 1 wherein the start code detector comprises:

a unique pattern detector coupled to receive the bit stream and detect start code prefixes, the unique pattern detector having an output on which possible start codes corresponding to detected start code prefixes are placed, and a start code identifier, coupled to receive the output of the unique pattern detector and the last layer output from the layer memory, for comparing the possible start codes from the unique pattern detector with the set of expected start codes, the start code identifier having a start code identifier output in a first state which indicates that an error has occurred, if no expected start code is similar to the possible start codes, and in a second state which identifies the detected start code and the corresponding layer, if an expected start code is similar to one of the possible start codes.

3. An apparatus for receiving and decoding a bit stream of data blocks which are organized in a hierarchical order of layers, each of the data blocks corresponding to one of the layers and including a start code which identifies the layer of the data block, the apparatus comprising:

a layer memory for storing data indicating the layer corresponding to the last start code received in the data stream, the layer memory having a last layer output, a first expected start code selector coupled to receive the last layer output from the layer memory, the first expected start code selector selecting and generating a first expected start code selector output identifying a set of expected start codes based on the last layer;

a start code detector, coupled to receive the bit stream and the first expected start code selector output, for detecting start codes by comparing data in the bit stream with the set of expected start codes, the start code detector selecting one of the expected start codes as a detected start code, if one of the expected start codes is similar to data in the bit stream, the start code detector having a start code detector output which identifies the detected start code and its corresponding layer, the start code detector including a unique pattern detector coupled to receive the bit stream and detect start code prefixes, the unique pattern detector having an output on which possible start codes corresponding to detected start code prefixes are placed, and a start code identifier, coupled to receive the output of the unique pattern detector and the last layer output from the layer memory, for comparing the possible start codes from the unique pattern detector with the set of expected start codes, the start code identifier having a start code identifier output in a first state which indicates that an error has occurred, if no expected start code is similar to the possible start codes, and in a second state which identifies the detected start code and the corresponding layer, if an expected start code is similar to one of the possible start codes;

means responsive to the start code detector output for updating the layer memory with data indicating the layer corresponding to the detected start code; and a block data decoder, responsive to the detected start code output from the start code detector, for decoding the data block corresponding to the detected start code, wherein the block data decoder is responsive to the start code identifier output being in the first state for suspending block data decoding, and wherein the apparatus further comprises a display controller, the display controller responsive to the start code identifier output being in the first state to perform error masking corresponding to the error.

4. An apparatus as set forth in claim 3 further comprising means for instructing the display controller to cease the error masking and instructing the block data decoder to resume block data decoding when the start code identifier next detects a start code corresponding to a layer which is the same as or higher in the layer hierarchy.

5. An apparatus for receiving and decoding a bit stream of data blocks which are organized in a hierarchical order of layers, each of the data blocks corresponding to one of the layers and including a start code which identifies the layer of the data block, the apparatus comprising:

a layer memory for storing data indicating the layer corresponding to the last start code received in the data stream, the layer memory having a last layer output;

a first expected start code selector coupled to receive the last layer output from the layer memory, the first expected start code selector selecting and generating a first expected start code selector output identifying a set of expected start codes based on the last layer;

a start code detector, coupled to receive the bit stream and the first expected start code selector output, for detecting start codes by comparing data in the bit stream with the set of expected start codes, the start code detector selecting one of the expected start codes as a detected start code, if one of the expected start codes is similar to data in the bit stream, the start code detector having a start code detector output which identifies the detected start code and its corresponding layer;

means responsive to the start code detector output for updating the layer memory with data indicating the layer corresponding to the detected start code; and a block data decoder, responsive to the detected start code output from the start code detector, for decoding the data block corresponding to the detected start code; wherein the start code detector comprises:

a unique pattern detector coupled to receive the bit stream and detect start code prefixes, the unique pattern detector having a unique pattern detector output on which possible start codes corresponding to detected start code prefixes are placed, a start code matching identifier, coupled to receive the unique pattern detector output and the first expected start code selector output, for comparing the possible start code from the unique pattern detector with the set of expected start codes, the start code matching identifier generating a replacement start signal output if the possible start code does not match any of the expected start codes, and a start code replacement unit, responsive to the replacement start signal output, the start code replacement unit comprising, a second expected start code selector for selecting one or more expected start codes based on the last layer, and generating an output indicating the expected start codes, a similarity calculator, coupled to receive expected start codes from the second expected start code selector and the possible start code, for calculating and generating an output indicating a Hamming distance of the possible start code to each of the expected start codes from the second expected start code selector, and a similarity based replacement identifier, coupled to receive the output of the similarity calculator, for selecting and generating a start code identifier output indicating the one of the expected start codes with the smallest Hamming distance to the possible start code.

6. An apparatus as set forth in claim 5 wherein the Hamming distances are calculated by determining the number of bits of each of the expected start codes which do not match the corresponding bit of the possible start code.

7. An apparatus as set forth in claim 5 wherein the Hamming distances are calculated for each expected start code by determining each bit of the expected start code which does not match the corresponding bit of the detected start code, weighting each of the bits based on its bit position to generate a weighted bit value and summing all of the weighted bit values.

8. An apparatus for receiving and decoding a bit stream of data blocks which are organized in a hierarchical order of layers, each of the data blocks corresponding to one of the layers and including a start code which identifies the layer of the data block, the apparatus comprising:

a layer memory for storing data indicating the layer corresponding to the last start code received in the data stream, the layer memory having a last layer output;

a first expected start code selector coupled to receive the last layer output from the layer memory, the first expected start code selector selecting and generating a first expected start code selector output identifying a set of expected start codes based on the last layer;

a start code detector, coupled to receive the bit stream and the first expected start code selector output, for detecting start codes by comparing data in the bit stream with the set of expected start codes, the start code detector selecting one of the expected start codes as a detected start code, if one of the expected start codes is similar to data in the bit stream, the start code detector having a start code detector output which identifies the detected start code and its corresponding layer;

means responsive to the start code detector output for updating the layer memory with data indicating the layer corresponding to the detected start code; and a block data decoder, responsive to the detected start code output from the start code detector, for decoding the data block corresponding to the detected start code; wherein the start code detector comprises:

a unique pattern detector coupled to receive the bit stream and detect start code prefixes, the unique pattern detector having a unique pattern detector output on which possible start codes corresponding to detected start code prefixes are placed, a start code matching identifier, coupled to receive the unique pattern detector output and the first expected start code selector output, for comparing the possible start code from the unique pattern detector with the set of expected start codes, the start code matching identifier generating a replacement start signal output if the possible start code does not match any of the expected start codes, and a start code replacement unit, responsive to the replacement start signal output, the start code replacement unit comprising, a second expected start code selector for selecting one or more expected start codes based on the last layer and generating an output indicating the expected start codes, a priority assigning numerator, coupled to receive expected start codes from the second expected start code selector and to receive the last layer output, for calculating and generating an output indicating a probability of occurrence for each expected start code received from the second expected start code selector, and a priority based replacement identifier, coupled to receive the output of the priority assigning numerator, for selecting and generating a start code identifier output indicating the one of the expected start codes with the highest probability of occurrence.

9. An apparatus as set forth in claim 8 wherein the priority assigning numerator output indicates priority of each expected start code by a numerical value based on probability of occurrence relative to other expected start codes.

10. An apparatus as set forth in claim 8 wherein the priority of each assigning numerator output indicates priority of each expected start code by its order of probability from most likely to least likely relative to other expected start codes without indicating actual probability of occurrence.

11. An apparatus for receiving and decoding a bit stream of data blocks which are organized in a hierarchical order of layers, each of the data blocks corresponding to one of the layers and including a start code which identifies the layer of the data block, the apparatus comprising:

a layer memory for storing data indicating the layer corresponding to the last start code received in the data stream, the layer memory having a last layer output;

a first expected start code selector coupled to receive the last layer output from the layer memory, the first expected start code selector selecting and generating a first expected start code selector output identifying a set of expected start codes based on the last layer;

a start code detector, coupled to receive the bit stream and the first expected start code selector output, for detecting start codes by comparing data in the bit stream with the set of expected start codes, the start code detector selecting one of the expected start codes as a detected start code, if one of the expected start codes is similar to data in the bit stream, the start code detector having a start code detector output which identifies the detected start code and its corresponding layer;

means responsive to the start code detector output for updating the layer memory with data indicating the layer corresponding to the detected start code; and a block data decoder, responsive to the detected start code output from the start code detector, for decoding the data block corresponding to the detected start code; wherein the start code detector comprises a replacement determiner for selecting a detected start code from the set of expected start codes, the replacement determiner locally decoding the block data for a predetermined time period in accordance with a plurality of the expected start codes and detecting a number of decoding errors for the block data for each of the plurality of expected start codes and selecting as the detected start code a one of the plurality of expected start codes in which the fewest decoding errors were detected.

12. A method for receiving and decoding a bit stream of data blocks, each comprising a digital coded bit sequence, which are organized in a hierarchy including a plurality of layers, each layer having associated therewith one of a plurality of layer types, wherein at least one layer of a high-order layer type is composed of at least one layer of a lower-order layer type, each of the data blocks corresponding to one of the layers and including a start code which identifies the layer of the data block, the method comprising the steps of:

storing data indicating the layer corresponding to the last start code received in the data stream, generating a set of expected start codes based upon the data indicating the layer wherein said set of expected start codes lists start codes of data blocks in layers of said high-order layer type before start codes of data blocks in layers of said lower-order layer type;

continuously comparing data in the bit stream with the set of expected start codes;

selecting one of the expected start codes as a detected start code based on the comparison, if one of the expected start codes is similar to data in the bit stream;

updating the last layer data with data indicating the layer corresponding to the detected start code; and decoding the block data corresponding to the detected start code in accordance with the detected start code.

13. A method as set forth in claim 12 wherein the comparing step comprises:

detecting start code prefixes in the bit stream, and comparing start codes corresponding to the prefixes with set of expected start codes.

14. A method as set forth in claim 13 further comprising the steps of:

suspending block data decoding if a detecting start code is not selected, and performing error masking if a detected start code is not selected.

15. A method for receiving and decoding a bit stream of data blocks which are organized in a hierarchical order of layers, each of the data blocks corresponding to one of the layers and including a start code which identifies the layer of the data block, the method comprising the steps of:

storing data indicating the layer corresponding to the last start code received in the data stream;

generating a set of expected start codes based upon the data indicating the layer;

continuously comparing data in the bit stream with the set of expected start codes, including steps of detecting start code prefixes in the bit stream, and comparing start codes corresponding to the prefixes with set of expected start codes;

selecting one of the expected start codes as a detected start code based on the comparison, if one of the expected start codes is similar to data in the bit stream;

updating the last layer data with data indicating the layer corresponding to the detected start code;

decoding the block data corresponding to the detected start code in accordance with the detected start code;

suspending block data decoding if a detected start code is not selected;

performing error masking if a detected start code is not selected; and ceasing the error masking and resuming block data decoding when a start code is detected corresponding to a layer which is the same as or higher in the layer hierarchy than the layer in which no selection was made.

16. A method for receiving and decoding a bit stream of data blocks which are organized in a hierarchical order of layers, each of the data blocks corresponding to one of the layers and including a start code which identifies the layer of the data block, the method comprising the steps of:

storing data indicating the layer corresponding to the last start code received in the data stream;

generating a set of expected start codes based upon the data indicating the layer;

continuously comparing data in the bit stream with the set of expected start codes, including steps of detecting start code prefixes in the bit stream, and comparing start codes corresponding to the prefixes with set of expected start codes;

selecting one of the expected start codes as a detected start code based on the comparison, if one of the expected start codes is similar to data in the bit stream;

updating the last layer data with data indicating the layer corresponding to the detected start code;

decoding the block data corresponding to the detected start code in accordance with the detected start code;

generating a replacement start signal if one of the expected start codes does not match the start code corresponding to the detected start code prefix;

selecting one or more expected start codes based on the last layer;

calculating a Hamming distance of the start code corresponding to the detected start code prefix to each of the expected start codes; and selecting as the detected start code a one of the expected start codes with the smallest Hamming distance to the start code corresponding to the detected start code prefix.

17. A method as set forth in claim 16 wherein the Hamming distance calculating step includes the step of determining the number of bits of each of the expected start codes which do not match the corresponding bit of the start code corresponding to the detected start code prefix.

18. A method as set forth in claim 16 wherein the Hamming distance calculating step for each expected start code comprises the steps of:

determining for each expected start code, each bit of the expected start code which does not match the corresponding bit of the start code corresponding to the detected start code prefix, weighting each of the bits based on its bit position to generate a weighted bit value, and summing all of the weighted bit values.

19. A method for receiving and decoding a bit stream of data blocks which are organized in a hierarchical order of layers, each of the data blocks corresponding to one of the layers and including a start code which identifies the layer of the data block, the method comprising the steps of:

storing data indicating the layer corresponding to the last start code received in the data stream;

generating a set of expected start codes based upon the data indicating the layer;

continuously comparing data in the bit stream with the set of expected start codes, including steps of detecting start code prefixes in the bit stream, and comparing start codes corresponding to the prefixes with set of expected start codes;

selecting one of the expected start codes as a detected start code based on the comparison, if one of the expected start codes is similar to data in the bit stream;

updating the last layer data with data indicating the layer corresponding to the detected start code;

decoding the block data corresponding to the detected start code in accordance with the detected start code;

calculating a probability of occurrence for each expected start code if no expected start code identically matches the start code corresponding to the detected start code prefix; and selecting a one of said expected start codes with the highest probability of occurrence as the detected start code.

20. A method for receiving and decoding a bit stream of data blocks which are organized in a hierarchical order of layers, each of the data blocks corresponding to one of the layers and including a start code which identifies the layer of the data block, the method comprising the steps of:

storing data indicating the layer corresponding to the last start code received in the data stream;

generating a set of expected start codes based upon the data indicating the layer;

continuously comparing data in the bit stream with the set of expected start codes;

selecting one of the expected start codes as a detected start code based on the comparison, if one of the expected start codes is similar to data in the bit stream;

updating the last layer data with data indicating the layer corresponding to the detected start code;

decoding the block data corresponding to the detected start code in accordance with the detected start code;

generating a replacement start signal if one of the expected start codes does not match the start code corresponding to the detected start code prefix;

selecting one or more expected start codes based on the last layer output;

calculating a Hamming distance of the start code corresponding to the detected start code prefix to each of the expected start codes;

calculating a probability of occurrence for each expected start code if no expected start code identically matches the start code corresponding to the detected start code prefix; and selecting as the detected start code a one of the expected start codes with the smallest value of W, where $$W=D[Pi(L)]-E[Pi(L)]$$

where

Pi(L) is an expected start code

D[Pi(L)] is the Hamming distance of the start code, and

E[Pi(L)] is the probability of occurrence of the expected start code.

21. A method for receiving and decoding a bit stream of data blocks which are organized in a hierarchical order of layers, each of the data blocks corresponding to one of the layers and including a start code which identifies the layer of the data block, the method comprising the steps of:

storing data indicating the layer corresponding to the last start code received in the data stream;

generating a set of expected start codes based upon the data indicating the layer;

continuously comparing data in the bit stream with the set of expected start codes, including steps of detecting start code prefixes in the bit stream, and comparing start codes corresponding to the prefixes with set of expected start codes;

selecting one of the expected start codes as a detected start code based on the comparison, if one of the expected start codes is similar to data in the bit stream, including steps of locally decoding block data corresponding to a detected start code prefix for a predetermined time period in accordance with a plurality of the expected start codes, detecting a number of decoding errors for the block data for each of the plurality of expected start codes, and selecting as the detected start code a one of the plurality of expected start codes in which the fewest decoding errors were detected;

updating the last layer data with data indicating the layer corresponding to the detected start code;

decoding the block data corresponding to the detected start code in accordance with the detected start code.

22. A data receiving apparatus, receiving a hierarchical data stream including a digital coded bit sequence, where a start code, indicating a layer of data, and corresponding data to the start code occur in a regular order under a prescribed rule, there being a plurality of data layers, and whereby a layer of incoming data corresponding to any one of a subset of the plurality of layers is expected based on a layer of data being decoded, and decoding data based on a layer of data corresponding to a start code, the data receiving apparatus comprising:

(a) a data supplying unit for supplying a data stream;

(b) a data decoding unit for decoding data in the data stream supplied by the data supplying unit;

(c) an analyzing unit for predicting possible layers for the incoming data based on the layer of data being decoded, for detecting a start code in a data stream corresponding to one of the possible layers, and for recognizing the layer of incoming data based upon the detected start code, wherein start codes of higher-order layers are recognized before start codes of lower-order layers; and (d) a controller for controlling the data decoding unit based on the layer of data recognized in the analyzing unit.

23. A data receiving apparatus of claim 22, wherein the analyzing unit comprises:

data layer memory for storing a layer of data being decoded; and start code detector for watching an incoming data stream and detecting a start code, for generating more than one start code expected next to be detected in reference to the layer of data stored in the data layer memory, for storing a layer of data corresponding to the detected start code in the data layer memory when the detected start code matches one of the expected start codes, and for outputting the layer of data corresponding to the detected start code to the controller.

24. A data receiving apparatus, receiving a data stream where a start code, indicating a type of data, and corresponding data to the start code occur in a regular order under a prescribed rule, whereby a type of incoming data is expected based on a type of data in process, and processing data based on a type of data corresponding to a start code, the data receiving apparatus comprising:

(a) a data supplying unit for supplying a data stream;

(b) a data processing unit for processing data in the data stream supplied by the data supplying unit;

(c) an analyzing unit for predicting possible types for the incoming data based on the type of data in process, and for detecting a start code in a data stream corresponding to one of the possible types, and for recognizing the type of incoming data based upon the detected start code, the analyzing unit including data type memory for storing a type of data in process; and start code detector for watching an incoming data stream and detecting a start code, for generating more than one type of start codes expected next to be detected in reference to the type of data stored in the data type memory, for storing a type of data corresponding to the detected start code in the data type memory when the detected start code matches one of the expected start codes, and for outputting the type of data corresponding to the detected start code to the controller;

(d) a controller for controlling the data processing unit based on the type of data recognized in the analyzing unit; and (e) resynchronization means for synchronizing to the data stream when a detected start code matches no expected start code.

25. A data receiving apparatus of claim 24 further comprises error masking means for masking an error caused by a desynchronized data receiving while the resynchronization means operates.

26. A data receiving apparatus, receiving a data stream where a start code, indicating a type of data, and corresponding data to the start code occur in a regular order under a prescribed rule, there being a plurality of data types, and whereby a type of incoming data corresponding to any one of a subset of the plurality of types is expected based on a type of data in process, and processing data based on a type of data corresponding to a start code, the data receiving apparatus comprising:

(a) a data supplying unit for supplying a data stream;

(b) a data processing unit for processing data in the data stream supplied by the data supplying unit;

(c) an analyzing unit for predicting possible types for the incoming data based on the type of data in process, and for detecting a start code in a data stream corresponding to one of the possible types, and for recognizing the type of incoming data based upon the detected start code, the analyzing unit comprising data type memory for storing a type of data in process, a start code detector for watching an incoming data stream and detecting a start code, for generating more than one type of start codes expected next to be detected in reference to the type of data stored in the data type memory, for storing a type of data corresponding to the detected start code in the data type memory when the detected start code matches one of the expected start codes, and for outputting the type of data corresponding to the detected start code to the controller, and a start code replacement unit which replaces a detected start code by one of the expected start codes when the detected start code matches no expected start code; and (d) a controller for controlling the data processing unit based on the type of data recognized in the analyzing unit.

27. A data receiving apparatus, receiving a data stream where a start code, indicating a type of data, and corresponding data to the start code occur in a regular order under a prescribed rule, there being a plurality of data types, and whereby a type of incoming data corresponding to any one of a subset of the plurality of types is expected based on a type of data in process, and processing data based on a type of data corresponding to a start code, the data receiving apparatus comprising:

(a) a data supplying unit for supplying a data stream;

(b) a data processing unit for processing data in the data stream supplied by the data supplying unit;

(c) an analyzing unit for predicting possible types for the incoming data based on the type of data in process, and for detecting a start code in a data stream corresponding to one of the possible types, and for recognizing the type of incoming data based upon the detected start code, the analyzing unit comprising data type memory for storing a type of data in process, a start code detector for watching an incoming data stream and detecting a start code, for generating more than one type of start codes expected next to be detected in reference to the type of data stored in the data type memory, for storing a type of data corresponding to the detected start code in the data type memory when the detected start code matches one of the expected start codes, and for outputting the type of data corresponding to the detected start code to the controller; and (d) a controller for controlling the data processing unit based on the type of data recognized in the analyzing unit;

wherein the data stream is organized in layers, and wherein the data type memory stores layer information of data in process.

28. A method of receiving hierarchical data of a plurality of layers, each including a digital coded bit sequence, the method comprising the steps of:

identifying a layer of data being decoded as that last decoded;

watching said incoming bit sequence and detecting a start code;

selecting a set of more than one start code expected next to be detected from among a number of start codes, the step of selecting responsive to the step of identifying and based on the layer of data determined by the step of identifying as that last decoded, wherein start codes of higher-order layers are selected before start codes of lower-order layers;

comparing the detected start code with each of the expected start codes;

updating the layer of data being decoded based on a layer of data corresponding to the detected start code when the detected start code matches one of the expected start codes;

decoding data based on the updated layer of data; and resynchronizing to the incoming bit sequence when the detected start code matches no expected start code.

29. A method of receiving data of a plurality of hierarchical layers, each including a digital coded bit sequence, the method comprising the steps of:

identifying a layer of data being decoded as that last decoded;

watching an incoming bit sequence and detecting a start code;

selecting a set of more than one start code expected next to be detected from among a number of start codes, the step of selecting responsive to the step of identifying and based on the layer of data determined by the step of identifying as that last decoded, wherein start codes of higher-order layers are selected before start codes of lower-order layers;

comparing the detected start code with each of the expected start codes;

replacing the detected start code by one of the expected start codes when the detected start code matches no expected start code;

updating the layer of data in process based on one of the detected start code and the replaced start code; and decoding data based on the updated layer of data being decoded.

*30. A method of data reception, comprising:*

(*a*) *identifying a layer of data being as that last decoded;*

(*b*) *observing an input bitstream to detect start codes;*

(*c*) *choosing, among plural types of start codes, one start code that is predicted to be upcoming when the data processing behavior must be initialized, or more than one start code, each of which is predicted to be upcoming, based on the type of data being processed corresponding to the layer identified in* (*a*), *wherein start codes of higher-order layers are prioritized relative to start codes of lower-order layers;*

(*d*) *comparing a detected start code with the one or more start codes chosen in* (*c*);

(*e*) *updating the type of data being processed depending on the type of data corresponding to a start code chosen in* (*c*) *when the detected start code matches the expected start code;*

(*f*) *processing data in accordance with the updated type of data; and*

(*g*) *resynchronizing with the input bitstream when the comparison of* (*d*) *shows a mismatch.*

*31. A data receiving apparatus, receiving a data stream where a start code, indicating a type of data, and corresponding data to the start code occur in a regular order under a prescribed rule, there being a plurality of data types, and whereby a type of incoming data corresponding to any one of a subset of the plurality of types is expected based on a type of data in process, and processing data based on a type of data corresponding to a start code, the data receiving apparatus comprising:*

(*a*) *a data supplying unit for supplying a data stream;*

(*b*) *a data processing unit for processing data in the data stream supplied by the data supplying unit;*

(*c*) *an analyzing unit for recognizing the upcoming type of data being processed by:*

(*c-1*) *identifying a layer of data being as that last decoded;*

(*c-2*) *observing said data stream to detect start codes;*

(*c-3*) *choosing, among plural types of start codes, one start code that is predicted to be upcoming when the data processing unit must be initialized, or more than one start code each of which is predicted to be upcoming, based on the type of data being processed, wherein start codes of higher-order layers are prioritized relative to start codes of lower-order layers;*

(*c-4*) *comparing a detected start code with the start code or more than one start codes chosen in* (*c-3*);

(*c-5*) *updating the type of data being processed depending on the type of data corresponding to the detected start code when it matches the expected start code chosen in* (*c-3*);

(*d*) *a controller for controlling the data processing unit based on the type of data being processed in the analyzing unit; and*

(*e*) *a resynchronization unit for finding the nest resynchronization point in said data stream when the comparison of* (*c-4*) *shows a mismatch.*

* * * * *

UNITED STATES PATENT AND TRADEMARK OFFICE

CERTIFICATE OF CORRECTION

PATENT NO. : RE 38,871 E
DATED : November 8, 2005
INVENTOR(S) : Shun-ichi Sekiguchi et al.

It is certified that error appears in the above-identified patent and that said Letters Patent is hereby corrected as shown below:

Title page,
Insert Item -- [30] Foreign Application Priority Data
-- Oct. 29, 1993 (JP) Japan……5-272083
Mar. 16, 1994 (JP) Japan……..…...…...6-045623 --.

Signed and Sealed this

Thirtieth Day of May, 2006

JON W. DUDAS
*Director of the United States Patent and Trademark Office*